United States Patent
Mashitani et al.

(10) Patent No.: US 6,710,920 B1
(45) Date of Patent: *Mar. 23, 2004

(54) STEREOSCOPIC DISPLAY

(75) Inventors: Ken Mashitani, Neyagawa (JP); Goro Hamagishi, Toyonaka (JP); Masutaka Inoue, Neyagawa (JP); Hideyuki Kanayama, Uji (JP)

(73) Assignee: Sanyo Electric Co., LTD, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 91 days.

This patent is subject to a terminal disclaimer.

(21) Appl. No.: 09/275,434

(22) Filed: Mar. 24, 1999

(30) Foreign Application Priority Data

Mar. 27, 1998 (JP) .......................... 10-082214
Dec. 28, 1998 (JP) .......................... 10-371989
Jan. 11, 1999 (JP) .......................... 11-004363

(51) Int. Cl.$^7$ .......................... G02B 27/22; G03B 21/00
(52) U.S. Cl. .................. 359/463; 359/462; 359/464; 353/7
(58) Field of Search ................ 359/463, 462, 359/464, 466, 456, 458; 348/51, 52, 56, 59; 353/7

(56) References Cited

U.S. PATENT DOCUMENTS

| | | | | |
|---|---|---|---|---|
| 4,987,487 A | * | 1/1991 | Ichinose et al. ........... 359/464 |
| 5,546,120 A | * | 8/1996 | Miller et al. ............... 348/59 |
| 5,818,399 A | * | 10/1998 | Omori et al. ............... 359/462 |
| 5,855,425 A | * | 1/1999 | Hamagishi ................. 359/464 |
| 5,930,037 A | * | 7/1999 | Imai ......................... 359/463 |
| 5,969,850 A | * | 10/1999 | Harrold et al. ............ 359/463 |
| 5,993,003 A | * | 11/1999 | McLaughlin ............... 353/7 |

* cited by examiner

*Primary Examiner*—Audrey Chang
(74) *Attorney, Agent, or Firm*—Arent Fox Kintner Plotkin & Kahn, PLLC

(57) ABSTRACT

This invention provides a stereoscopic display without using eyeglasses which does not require a means to switch images for left and right eyes and by which each viewer can observe a stereoscopic image even when many persons observe an image. The display includes a projector for a left eye 1L, a projector for a right eye 1R, and lenticular lens on a light incident side 2a which forms images for left and right eyes projected from each projector on a diffusing plate 2b alternately. A shutter means 4L, 4R include a plurality of shutter regions which can switch between light transmission and light shading and are placed laterally, and form a narrow-width image light reaching region, of which width is less than that of the shutter region, in each image forming region on the diffusing plate. Lenticular lens on a light incident side 2c guides an image in a narrow-width image light reaching region in an image forming region for a left eye to a viewer's left eye and an image in a narrow-width image light reaching region in an image forming region for a right eye to a viewer's right eye. A shutter control means 5 controls light transmission and light shading of said shutter region on the basis of output results from a sensor which detects a viewer's position.

4 Claims, 18 Drawing Sheets

STEREOSCOPIC DISPLAY

BACKGROUND OF THE INVENTION

1. Field of the Invention

This invention relates to a stereoscopic display by which a stereoscopic image can be observed without using special eye-glasses.

2. Description of the Prior Art

A stereoscopic display of double-lenticular type which uses two liquid crystal projectors and a double lenticular screen as a screen to realize stereoscopic image display without using special eye-glasses has been proposed. In the stereoscopic display of this type as shown in FIG. 15, one liquid crystal projector 100a displays an image for a left eye, and another liquid crystal projector 100b displays an image for a right eye. The images from the projectors are projected on a double lenticular screen 200 which is arranged in front of the projectors. The double lenticular screen 200 is constructed so that a diffusing plate 200b, which forms an image, is sandwiched by lenticular screens 200a and 200c. Images for left and right eyes become vertical stripe-shaped images 200bL and 200bR respectively by passing through the lenticular screen 200a, which is positioned on a light incident side (on the side of liquid crystal projectors 100a and 100b). And the vertical stripe-shaped images 200bL and 200bR are formed on the diffusing plate 200b. After that, these images are separated into the stripe-shaped image for a right eye and a left eye by passing through the lenticular screen 200c which is positioned on a light emitting side of the diffusing plate 200b (on the side of a viewer), then the image for a right eye is guided to a right eye (3R) of a viewer 300 and the image for a left eye is guided to a left eye (3L) of the viewer 300. The viewer, who observes these vertical stripe-shaped images for left and right eyes by the respective eyes, can observe a stereoscopic image without using special eye-glasses, due to the binocular parallax effect.

The stereoscopic display of this type provides a region in which an image for a right eye is visible and a region in which an image for a left eye is visible alternately at the optimum viewing distance from a screen 200 ("D" in the figure) as shown in FIG. 16. The "R" region indicated by an arrow is a region where an image for a right eye can be observed and the "L" region is a region where an image for a left eye where an image for a left eye can be observed. Accordingly, a viewer can observe a stereoscopic image when the right eye 3R of the viewer is in the "R" region and the left eye 3L is in the "L" region (the viewer is at the "A" position in the figure). When the right eye of the viewer is in the "L" region and the left eye is in the "R" region (the viewer is at the "B" position in the figure), a viewer observes a pseudo-stereoscopic image and can not observe a stereoscopic image.

The conventional methods which can prevent a pseudo-stereoscopic image caused by a shift of the viewer's head include the following one. As illustrated in FIGS. 17 and 18, a sensor 210 which detects a head position of a viewer 300 detects a head position of the viewer 300. When the sensor determines the viewer is at a pseudo-stereoscopic viewing position, images from the two projectors 100a and 100b (not shown in FIGS. 17 and 18) are replaced from one another. In such a construction, when the viewer 300 moves from the stereoscopic viewing position of image to the pseudo-stereoscopic viewing position (FIG. 17), the images are replaced from one another as shown in FIG. 18. As a result, an image viewing region "R" of diamond shape can be placed at a position corresponding to the viewer's right eye, and an image viewing region "L" of diamond shape can be placed at a position corresponding to the viewer's left eye.

SUMMARY OF THE INVENTION

The conventional method as above mentioned requires, however, a means to switch images for left and right eyes. When a large sized display is used, the number of viewer is sometimes plural. In this case, one of the viewer moves and thus images for a left eye and for a right eye are switched. This causes a problem that the other viewers who are in stereoscopic position can not observe stereoscopic images.

The present invention is made in consideration of the above circumstances and it is an object of the invention to provide a stereoscopic display without using special eye-glasses which enable each viewer to observe a stereoscopic image without using a means to switch images for left and right eyes even when images are observed by a plurality of viewers.

To solve the problem, a stereoscopic display without using eye-glasses of the present invention comprises a first projector which projects an image for a left eye, a second projector which projects an image for a right eye, an image forming means which forms images for left and right eyes projected from the projectors onto a diffusing plate, a shutter means which includes a plurality of shutter regions disposed laterally which can switch between light transmission and light shading, and forms a narrow-width image light reaching region, of which width is less than that of the image forming region, in each image forming region on the diffusing plate, a light guide means which guides an image in a narrow-width image light reaching region for a left eye in the image forming region for a left eye to the left eye of the viewer and guides an image in a narrow-width image light reaching region for a right eye in the image forming region for a right eye to the right eye of the viewer, a shutter control means which controls light transmission and light shading of the shutter region on the basis of output results from a sensor which detects a viewer's position.

In the above construction, each image is fractionized in the image forming region for a left eye and the image forming region for a right eye on the diffusing plate due to the placement of shutter means . That is, an image light region of narrow-width (a light emitting point) is formed in the narrow-width image light reaching region. The images in each narrow-width image light reaching region which are fractionized move respectively in response to the viewer's position when being controlled light transmission and light shading of each shutter region by the shutter control means, resulting in realization of head tracking against the viewer. The more images in the narrow-width image light reaching region formed in each image forming region exist, the more viewers can observe a stereoscopic image.

A stereoscopic display without using eye-glasses of this invention comprises a left-eye system, a right-eye system, and a half mirror which guides an image for a left eye from the left-eye system and an image for a right eye from the right-eye system by transmitting an image light from either of the systems and reflecting an image light from the other system, further, the left-eye system is composed by a first projector which projects an image for a left eye, an image forming means which forms an image for the left eye projected from the projector onto the diffusing plate in predetermined width, a shutter means which includes a plurality of shutter regions disposed laterally which can switch between light transmission and light shading, and forms a narrow-width image light reaching region, of which width is less than that of the image forming region, in each image forming region on the diffusing plate, a light guide means which guides an image in a narrow-width image light reaching region in the image forming region to a left eye of a viewer, a shutter control means which controls light transmission and light shading of the shutter region on the basis of output results from a sensor which detects a viewer's position, and the right-eye system is composed by a second projector which projects an image for a right eye, an image forming means which forms an image for the right eye projected from the projector onto the diffusing plate, a shutter means which includes a plurality of shutter regions disposed laterally which can switch between light transmission and light shading, and forms a narrow-width image light reaching region, of which width is less than that of the image forming region, in each image forming region on the diffusing plate, a light guide means which guides an image in a narrow-width image light reaching region for the right eye in the image forming region for a right eye to the right eye of a viewer, a shutter control means which controls light transmission and light shading of the shutter region on the basis of output results from a sensor which detects a viewer's position.

In the above construction, the above head tracking can be achieved.

The shutter means may be arranged in front of projection lenses of the projectors and may include two or more than two shutter regions which can switch light transmission and light shading and are placed laterally in width less than that of the projection lens. The shutter means may be arranged on a light incident side or light emitting side of the diffusing plate and may include two or more than two shutter regions which can switch light transmission and light shading and are placed laterally in width less than that of the image forming region.

To solve the above-mentioned problem, a stereoscopic display without using eye-glasses of this invention comprises a first projector which projects an image for a left eye, a second projector which projects an image for a right eye, an image forming means which forms images for left and right eyes projected from the projectors onto a diffusing plate by overlapping an image forming region for a left eye and an image forming region for a right eye, a first shutter means which includes a plurality of shutter regions disposed laterally which can switch between light transmission and light shading, and forms a narrow-width image light reaching region, of which width is less than that of the image forming region, in each image forming region for a left eye on the diffusing plate, a second shutter means which includes a plurality of shutter regions disposed laterally which can switch between light transmission and light shading, and forms a narrow-width image light reaching region, of which width is less than that of the image forming region, in each image forming region for a right eye on the diffusing plate, a light guide means which collects images from narrow-width image light reaching regions in the image forming regions in a position spaced apart by a predetermined distance from the diffusing plate, and a width between the images is equal to or shorter than the interval between the viewer's pupils, and a shutter control means which controls light transmission and light shading of the shutter regions of the first and second shutter means on the basis of output results from a sensor which detects a viewer's position, wherein the shutter means controls the first and second shutter means so as that a narrow-width image light reaching region in an image forming region for a left eye and a narrow-width image light reaching region in an image forming region for a right eye do not share a same region on the diffusing plate.

In the above construction, image light regions of narrow-width (light emitting point) are formed in each narrow-width image light reaching region which is formed in image forming regions for left and right eyes on the diffusing plate by arranging the shutter means. The images in each narrow-width image light reaching region which are fractionized move respectively in response to the viewer's position when being controlled light transmission and light shading of each shutter region by the shutter control means, resulting in realization of head tracking against the viewer. Also, the image forming region for a left eye and the image forming region for a right eye overlap and form on the diffusing plate. Therefore, it becomes easier to form many narrow-width image light reaching regions in each image forming region, since the size of a single image forming region is larger than that when the images are formed alternately. The more images in the narrow-width image light reaching region formed in each image forming region exist, the more viewers can observe a stereoscopic image.

The first and second shutter means may be arranged in front of projection lenses of the projectors and may include two or more than two shutter regions, which can switch light transmission and light shading and are placed laterally in width less than that of the projection lens. In this case, the first and second shutter means may be same size with regard to the whole area and can be arranged laterally to be spaced apart from each other by a length integer times as long as the length of the whole shutter region. In such a construction, a single image forming region of image forming regions for a left eye and for a right eye are formed on the diffusing plate and are formed on the same area. Consequently each image shifts by a length integer times of image forming regions. Therefore, a desired stereoscopic image can be observed when either of the image for a left eye or the image for a right eye, which are formed on the same single image forming region on the diffusing plate shifts to the opposite direction by a length integer times of image forming regions.

The first and second shutter means may be arranged at a stop of the projection lens of the projector and may include two or more than two shutter regions, which can switch light transmission and light shading and are placed laterally in width less than the diameter of the stop. In such a construction, regardless of shutter regions of a shutter means, an image light from the projector is projected evenly from the projection lens and an image is formed in a narrow-width image light reaching region in an image forming region on a diffusing plate in response to a light transmitting region of the shutter means without failure.

A stereoscopic display without using eye-glasses of this invention comprises a projector which projects an image for a left eye and an image for a right eye in sequence, an image forming means which forms images for left and right eyes projected from the projectors onto a diffusing plate, a shutter means which includes a plurality of shutter regions that can switch between light transmission and light shading, and forms a narrow-width image light reaching region, of which width is less than that of the image forming region, in each image forming region on the diffusing plate, a light guide means which collects images from narrow-width image light reaching regions in the image forming regions to a position spaced apart from the diffusing plate by a predetermined distance, and the width between the images is equal to or shorter than the interval between the viewer's pupils, and a shutter control means which controls light transmission and light shading of the shutter region on the basis of output results from a sensor which detects a viewer's position.

In the above construction, each image is fractionized in the image forming region for a left eye and the image forming region for a right eye on the diffusing plate due to the placement of shutter means . That is, an image light region of narrow-width (a light emitting point) is formed in the narrow-width image light reaching region. The images in each fractionaized narrow-width image light reaching region move respectively in response to the viewer's position when being controlled light transmission and light shading of each shutter region by the shutter control means, resulting in realization of head tracking against the viewer. The more images in the narrow-width image light reaching region formed in each image forming region exist, the more viewers can observe a stereoscopic image.

The shutter means may be arranged in front of a projection lens of the projector and may include two or more than two shutter regions, which can switch light transmission and light shading and are placed laterally in width less than that of the projection lens.

The shutter means may be arranged at a stop of projection lens of the projector and may include two or more than two shutter regions, which can switch light transmission and light shading and are placed laterally in width less than the diameter of the stop. In such a construction, regardless of shutter regions of a shutter means, an image light from the projector is projected evenly and an image is formed in a narrow-width image light reaching region in an image forming region on a diffusing plate in response to a light transmitting region of the shutter means without failure.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
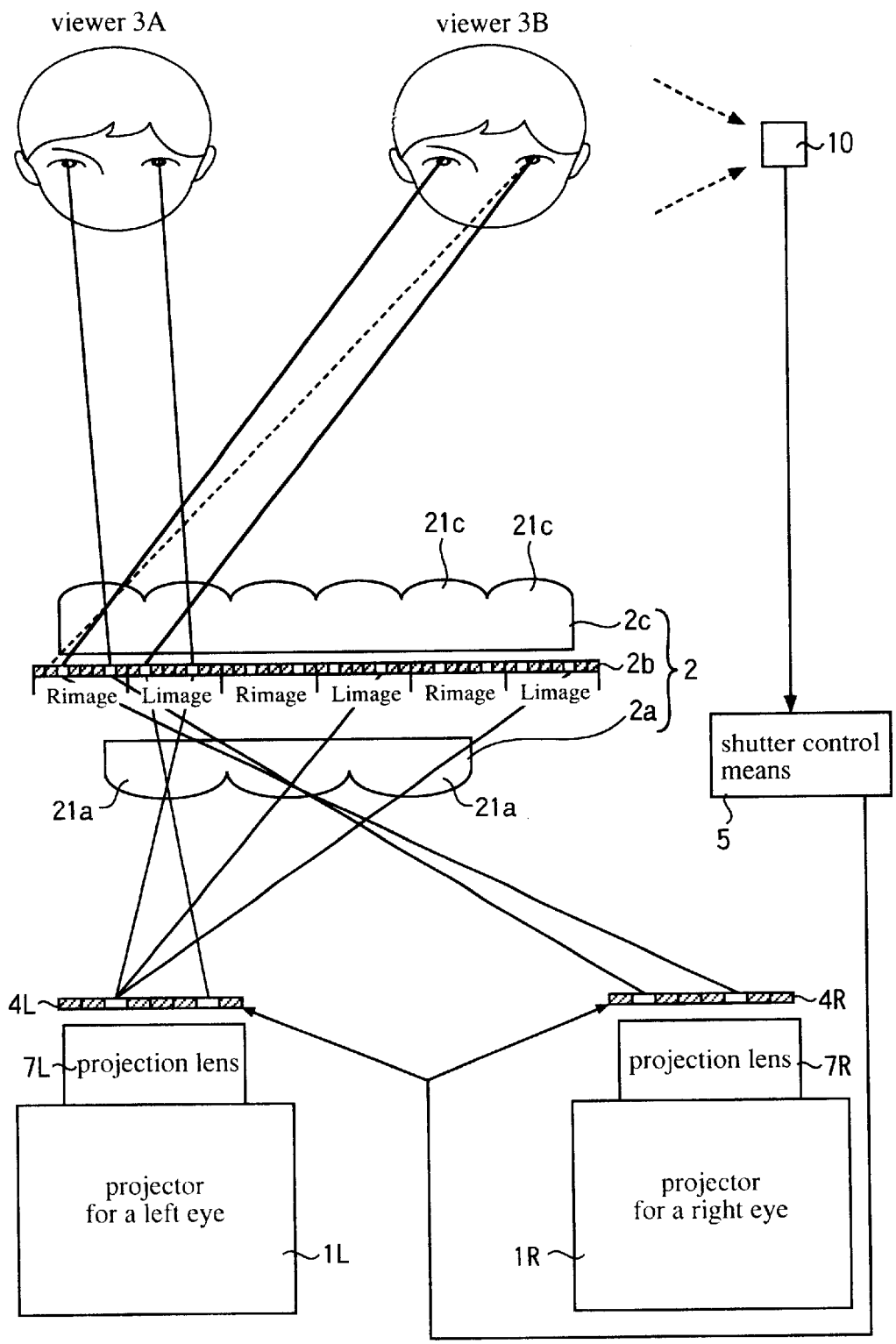
FIG. 1 is an explanatory view showing a stereoscopic display without using eye-glasses according to a first embodiment of the present invention.
Figure 2:
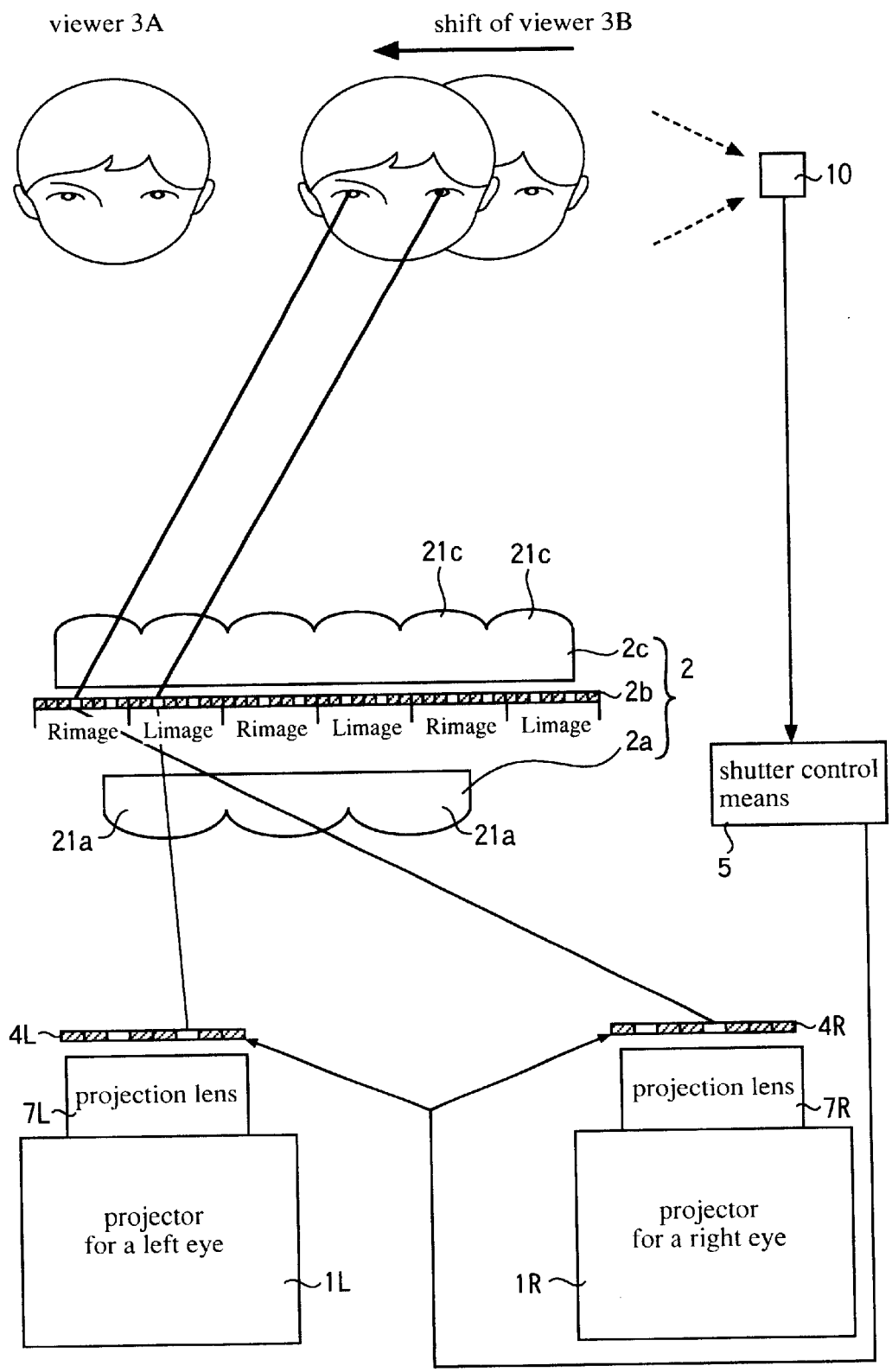
FIG. 2 is an explanatory view showing an appearance where a viewer moves from the position illustrated in FIG. 1 by the interval between the viewer's pupils.

Embodiments of this invention will be described in detail hereinbelow with reference to the drawings. FIG. 1 is an explanatory view showing a stereoscopic display without using eye-glasses according to a first embodiment of this invention. FIG. 2 is an explanatory view showing an appearance where a viewer's head 3B moves to the left from the position illustrated in FIG. 1 by the interval between the viewer's pupils.

The stereoscopic display without using eye-glasses according to the first embodiment comprises a screen 2, a first projector 1L, a second projector 1R, shutter means 4L and 4R which are arranged in front of projection lenses of each projector, a sensor 10 detecting head positions of viewers 3 . . . , and a shutter control means 5 which controls the shutter means 4L and 4R in response to values detected by the sensor 10.

The first projector 1L projects an image for a left eye. The second projector 1R projects an image for a right eye. For example, a liquid crystal projector is employed as the projectors 1L and 1R.

The shutter means 4L and 4R has eight shutter regions, placed laterally, which can switch between light transmission and light shading and the width of the region is shorter than those of the projection lens. Each of the shutter means 4L and 4R includes a TN liquid crystal layer, a pair of transparent glass plates which sandwich the TN liquid crystal layer, ITO stripe-pattern electrode of one glass plate, ITO electrode of another glass plate, and light polarizing plates on a light emitting side or light polarizing plates on a light emitting side and on a light incident side. The ITO stripe-pattern electrode consists of ITO layer in eight vertical stripe-shape corresponding with the number of the shutter regions. Although the shutter means in this embodiment is composed by a TN liquid crystal panel, liquid crystal panels of other types, such as polymer dispersed liquid crystal panel, can also be used.

The shutter control means 5 controls light transmission and light shading of the shutter regions on the basis of output results from the sensor 10 in response to positions of the viewers 3. In FIG. 1 where two persons (3A and 3B) observe an image, the shutter means 4L chooses the third and seventh shutter regions from the left side of the figure as the apertures, and the shutter means 4R chooses the second and sixth shutter regions from the left side of the figure as the apertures. In FIG. 2 where the head of the viewer 3B illustrated in FIG. 1 shifts to the left by the interval between the viewer's pupils, the shutter means 4L chooses the third and sixth shutter regions from the left side of the figure as the apertures, and the shutter means 4R chooses the second and fifth shutter regions from the left side of the figure as the apertures.

Figure 15:
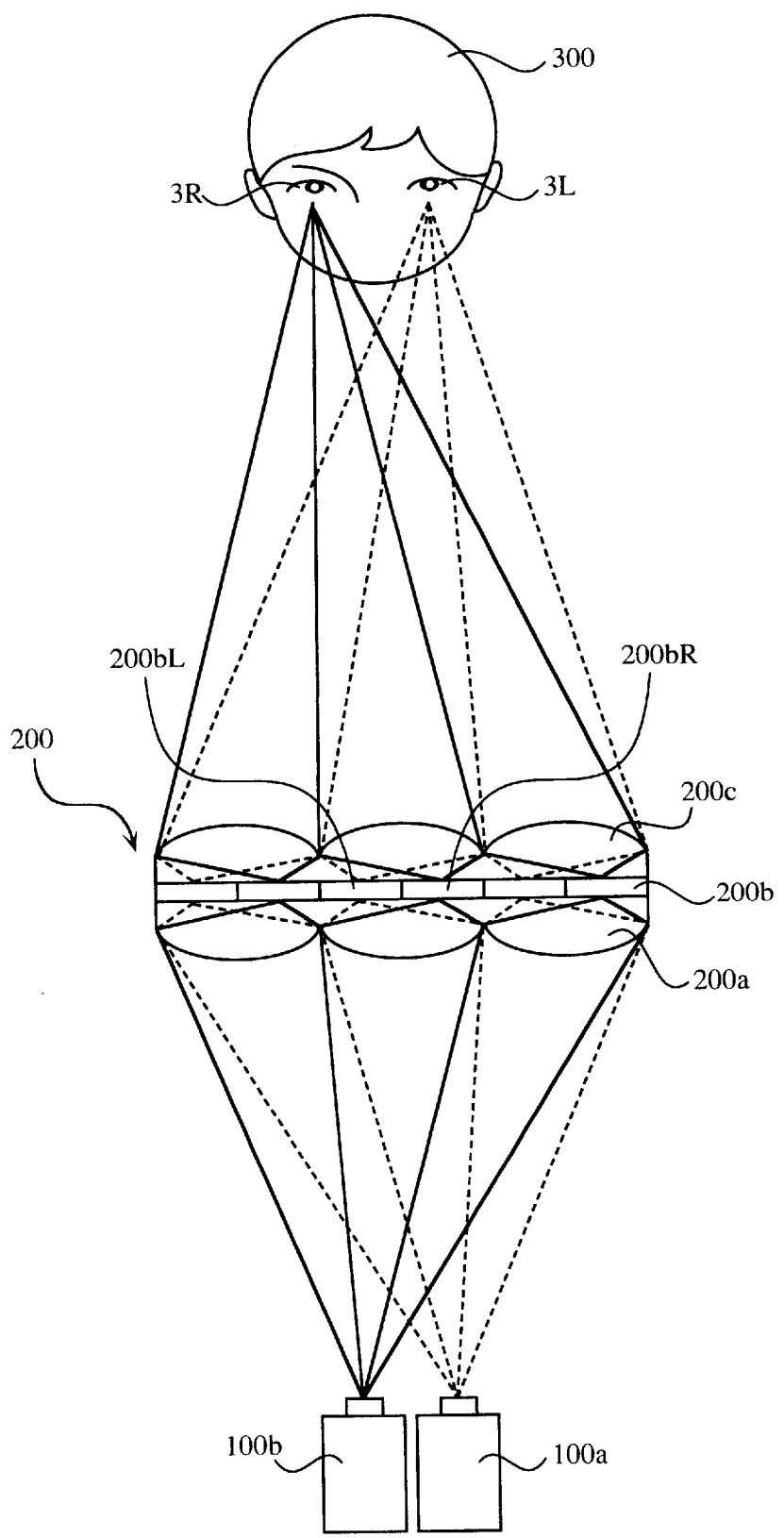
FIG. 15 is an explanatory view showing a conventional stereoscopic display without using eye-glasses.
Figure 16:
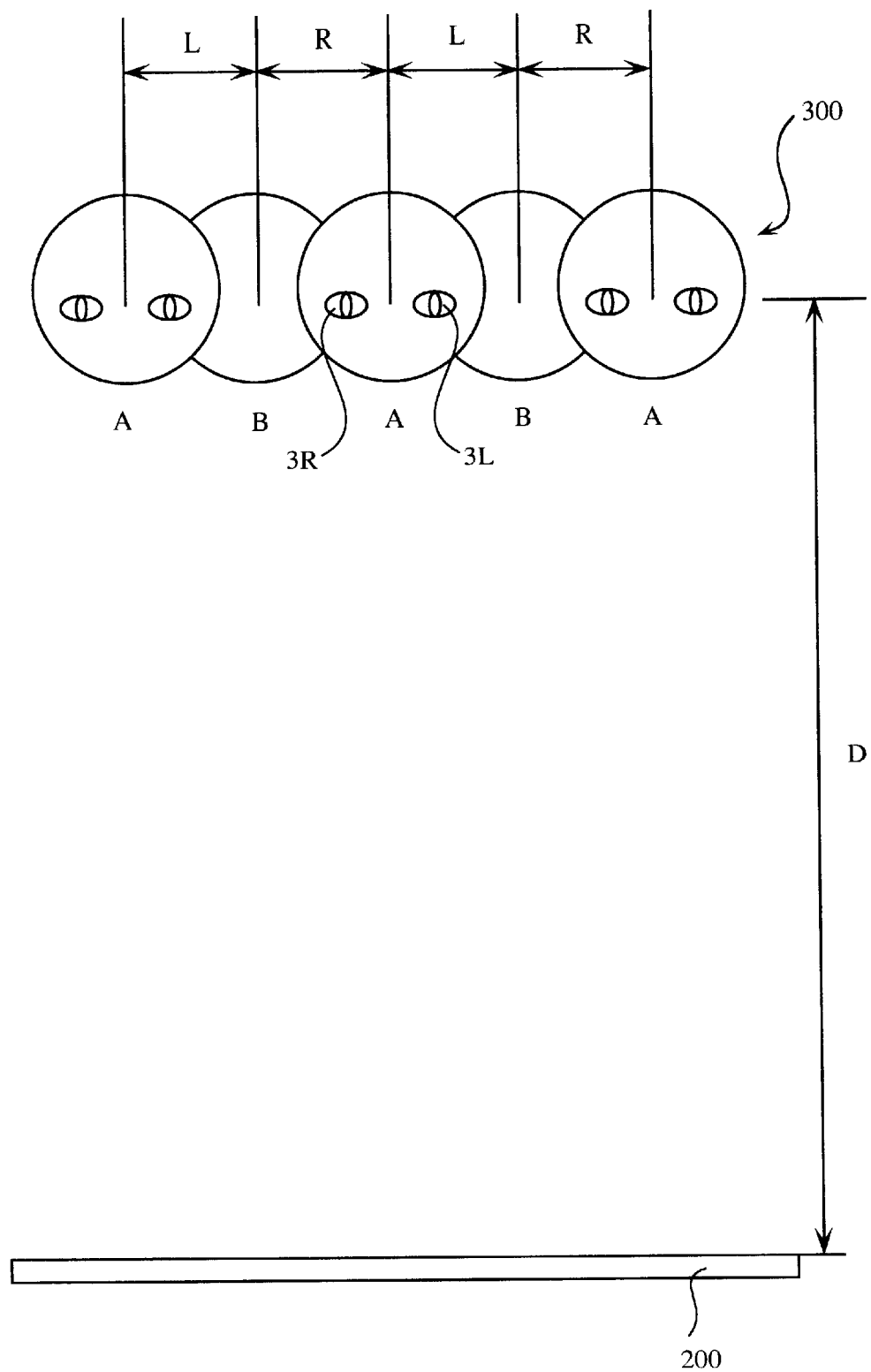
FIG. 16 is an explanatory view showing an appearance where regions in which images for a right eye and for a left eye can be observed alternately exist in the construction of FIG. 15.
Figure 17:
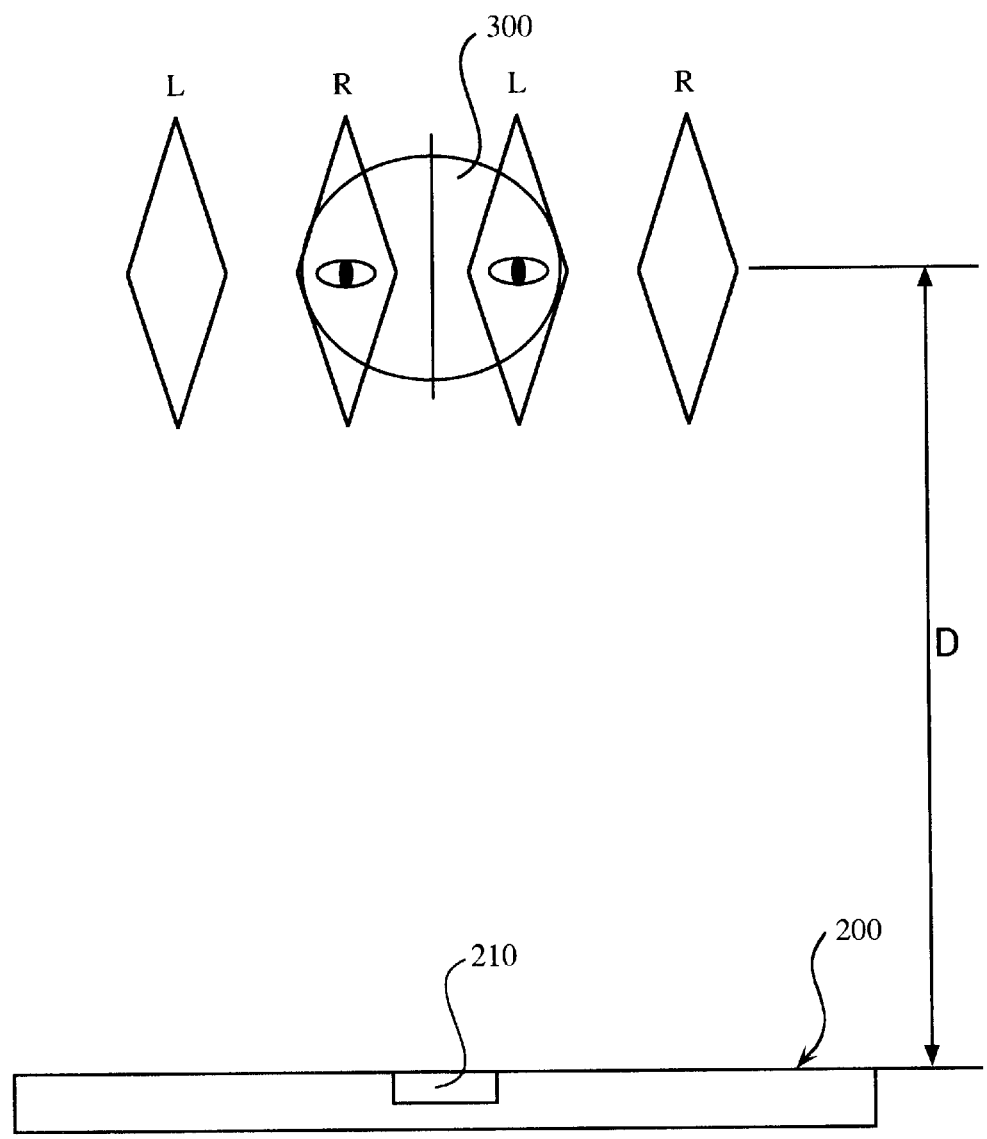
FIG. 17 is an explanatory view showing an appearance where images displayed for right and left eyes shifts alternately in response with a viewer's position in the construction of FIG. 15.
Figure 18:
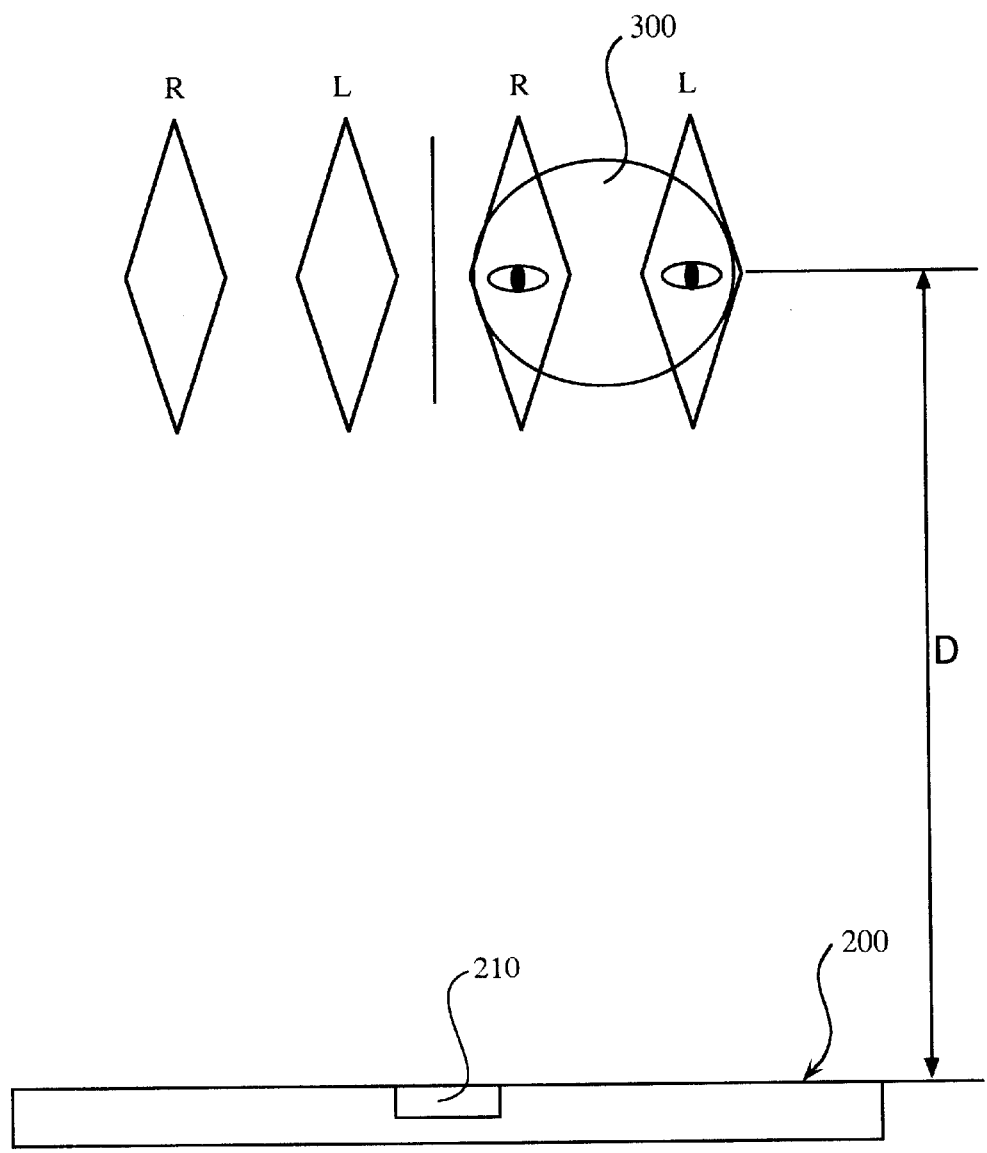
FIG. 18 is an explanatory view showing an appearance where images displayed for right and left eyes shift alternately in response to a viewer's position in the construction of FIG. 15.

The screen 2 comprises a diffusing plate 2b as an image forming surface, lenticular lens on a light incident side 2a as an image forming means arranged on a light incident surface of the diffusing plate 2b, and lenticular lens on a light emitting side 2c as a light guide means arranged on a light emitting surface of the diffusing plate 2b. The lenticular lens on a light incident side 2a includes lens portions 21a and forms images for left and right eyes projected from the projectors 1L and 1R, in vertical stripe-shape onto the diffusing plate 2b. By passing through the shutter means 4L, 4R and the lenticular lens on the light incident side 2a, narrow-width images for a left eye of which number corresponds with that of the shutter regions chosen as apertures are formed in an image forming region for a left eye (L image region) on the diffusing plate 2b, narrow-width images for a right eye of which number corresponds with that of the shutter regions chosen as apertures are formed in an image forming region for a right eye (R image region) on the diffusing plate 2b. The lenticular lens on the light emitting side 2c includes lens portions 21c . . . which are placed by a pitch corresponding with a pitch of each image forming region of the diffusing plate 2b. The lens portions 21c . . . have a pitch approximately half of a lens portion of a lenticular lens on a light emitting side in FIG. 15. A narrow-width image for a left eye which is formed in an image forming region for a left eye on the diffusing plate 2b in response to each shutter region of light transmitting state is guided to the left eyes of the viewers 3A and 3B. A narrow-width image for a right eye which is formed in an image forming region for a right eye on the diffusing plate 2b in response to each shutter region of light transmitting state is guided to the right eyes of the viewers 3A and 3B.

When all shutter regions of the shutter means 4L and 4R are chosen as apertures (the whole area becomes transparent), the whole area of each image forming region serves as a light emitting point. Consequently, an image, which passes through each lens portion 21c of each image forming region and is observed at a viewing position, becomes much larger than the interval between the viewer's pupils, resulting in that the viewer can not recognize a stereoscopic image. When an image light passes by a width corresponding with one shutter region of the shutter means 4L and 4R, that single region of each image forming region (a narrow-width image forming region) serves as a light emitting point.

Consequently, an image, which passes through each lens portion 21c from the single region of each image forming region and is observed at a viewing position, is equal to the interval between the viewer's pupils. When the single region of the narrow-width image forming regions shifts by one, an image, which passes through each lens portion 21c and is observed at a viewing position, shifts by a length equal to the interval between the viewer's pupils.

As show in FIG. 2, only the viewer 3B shifts to the left from the position illustrated in FIG. 1 by the interval between the viewer's pupils. A sensor 10 detects the shift of the viewer 3B and gives that information to a shutter control means 5. The shutter control means 5 gives signals on shutter ON/OFF information to the shutter means 4L and 4R. The shutter ON/OFF signal in the case of FIG. 2 tells the shutter means 4L to close the seventh shutter region and open the sixth shutter region (to make light transmit) from the left side of the figure and tells the shutter means 4R to close the sixth shutter region and open the fifth shutter region (to make light transmit) from the left side of the figure. When an open shutter region shifts, the single region of the narrow-width image forming region of the diffusing plate 2b shifts to the right by one and an image, which passes through each lens portion 21c from the shifted single region and is observed at a viewing position, shifts to the left by a length equal to the interval between the viewer's pupils, resulting in that the viewer can observe a stereoscopic image even at a position after moving.

Figure 3:
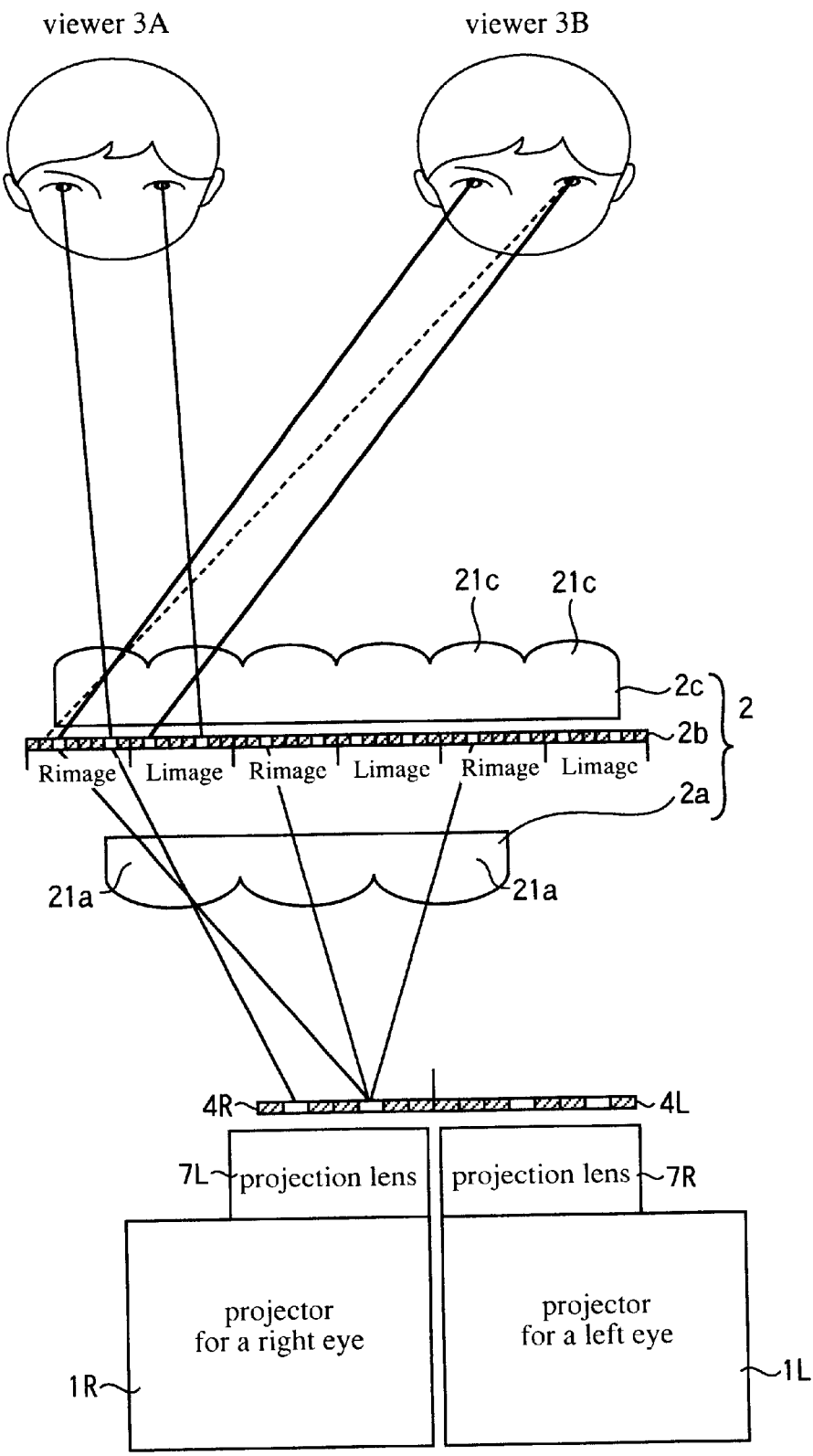
FIG. 3 is an explanatory view showing another arrangement of the projectors in FIG. 1.

The projectors 1L, 1R and the shutter means 4L, 4R can be arranged adjacent to one another or can be replaced between the left one and the right one as shown in FIG. 3. It is also possible to employ parallax barrier instead of lenticular lenses 2a, 2c though the brightness may be lost.

Figure 4:
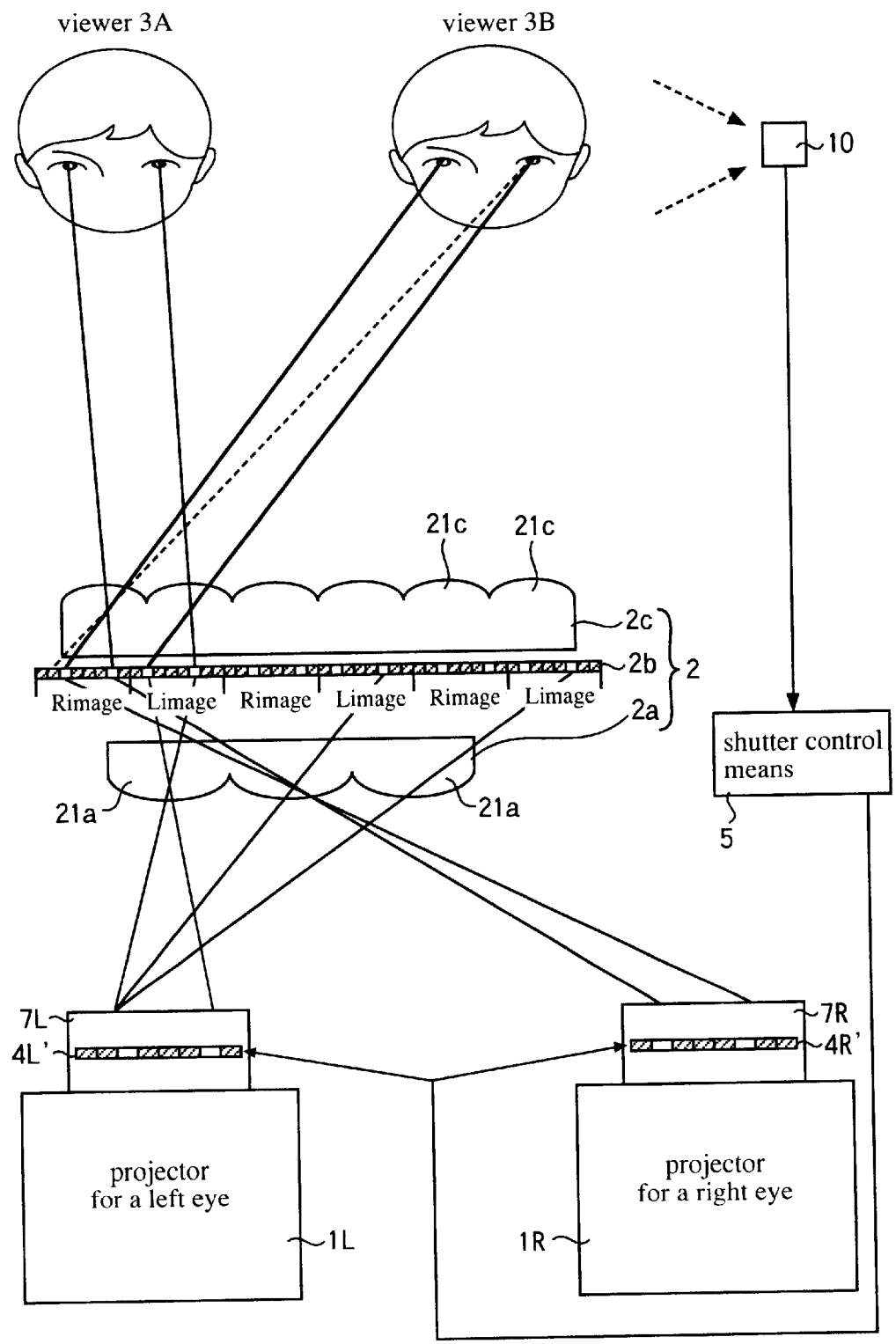
FIG. 4 is an explanatory view showing another example of a stereoscopic display without using eye-glasses according to the first embodiment, where a shutter is arranged at a stop of a projection lens.

As shown in FIG. 4, the shutter means 4L', 4R' can be arranged at a stop of the projection lenses 7L, 7R, although they are arranged in front of the projector lenses 7L, 7R of the projectors 1L, 1R in this embodiment. This arrangement is effective in the following case as described in the above embodiment; the shutter means 4L, 4R are arranged in front of the projection lenses 7L, 7R of the projectors 1L, 1R, the image light does not reach the narrow-width image light reaching region in each image forming region, and fail to form an image due to the arrangement of compositions such as the projectors 1L, 1R, the diffusing plate 2b etc. The image should have been formed at both ends of the diffusing plate 2b in response to the transmitting regions of the shutter means 4L, 4R. When the shutter means 4L', 4R' are arranged at the stop of the projection lenses 7L, 7R, even image light from the projectors 1L, 1R are projected from the projection lenses 7L, 7R regardless of the shutter regions of the shutter means 4L', 4R'. As a result, the images are formed in a narrow-width image light reaching region in the image forming region on the diffusing plate 2b in response to the light transmitting region of the shutter means without failure.

Figure 5:
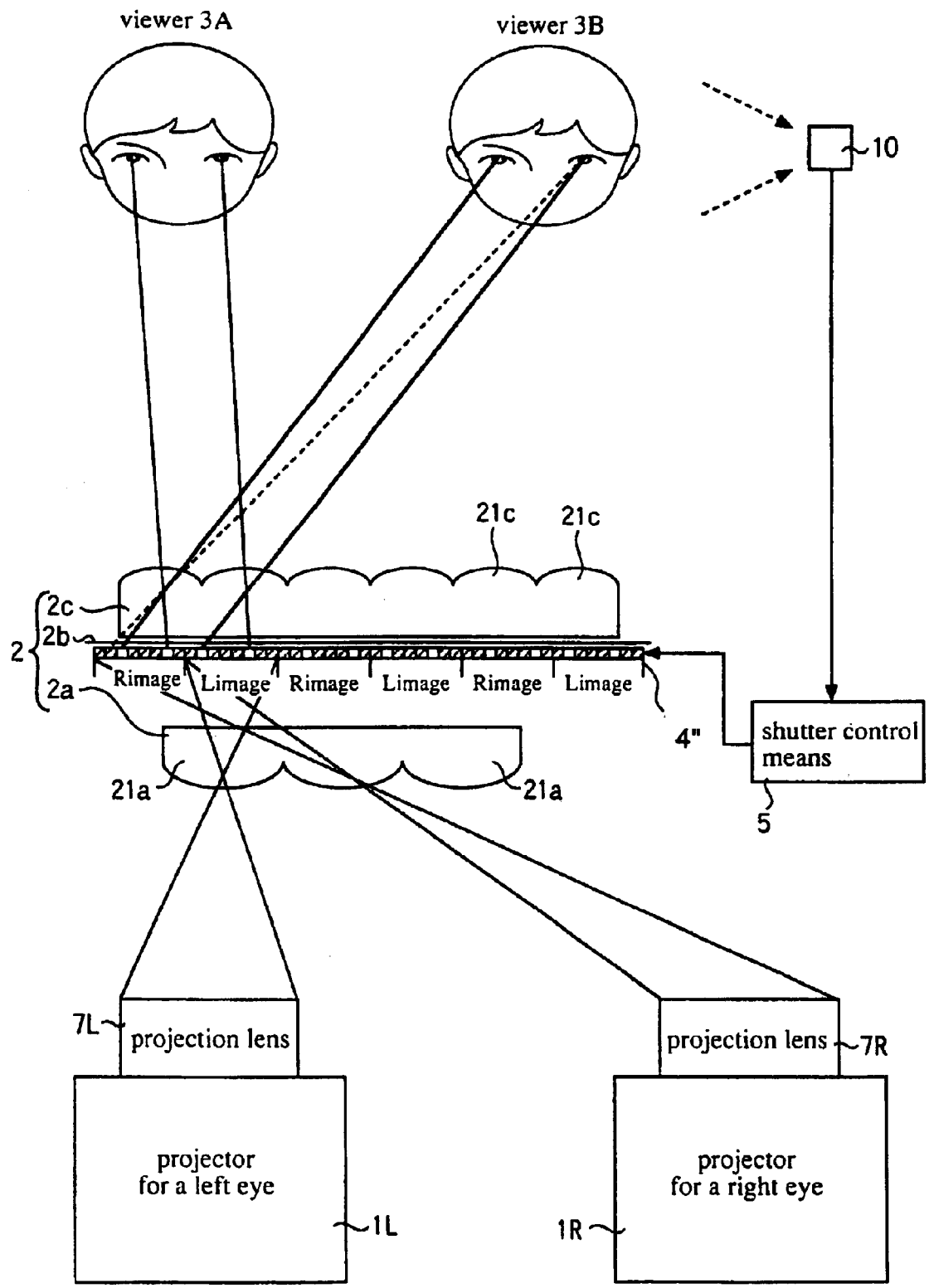
FIG. 5 is the other example of the first embodiment and an explanatory view showing a stereoscopic display without using eye-glasses, of which shutter is arranged in front of a diffusing plate.

As shown in FIG. 5, a shutter means 4 having shutter regions which correspond with a narrow-width image forming region in size can be arranged on a light incident side of the diffusing plate 2b (also can be arranged on a light emitting side), instead of the shutter means 4L, 4R arranged in front of the projection lenses of the projectors. Furthermore, auto-stereoscopic display can be constructed when the images to be displayed are differentiated in response to positions of viewers (images shoot from various direction are displayed alternately in proper manner). The width of an image which passes through each lens portion 21c of a narrow-width image forming region and is observed at a viewing position should be less than the interval between the viewer's pupils. Images can more smoothly change in response to the shift of the viewer as the width of an image is shorter. The above described change can be applicable in the following second embodiment.

A second embodiment of this invention will be described in detail hereinbelow with reference to the drawings.

Figure 6:
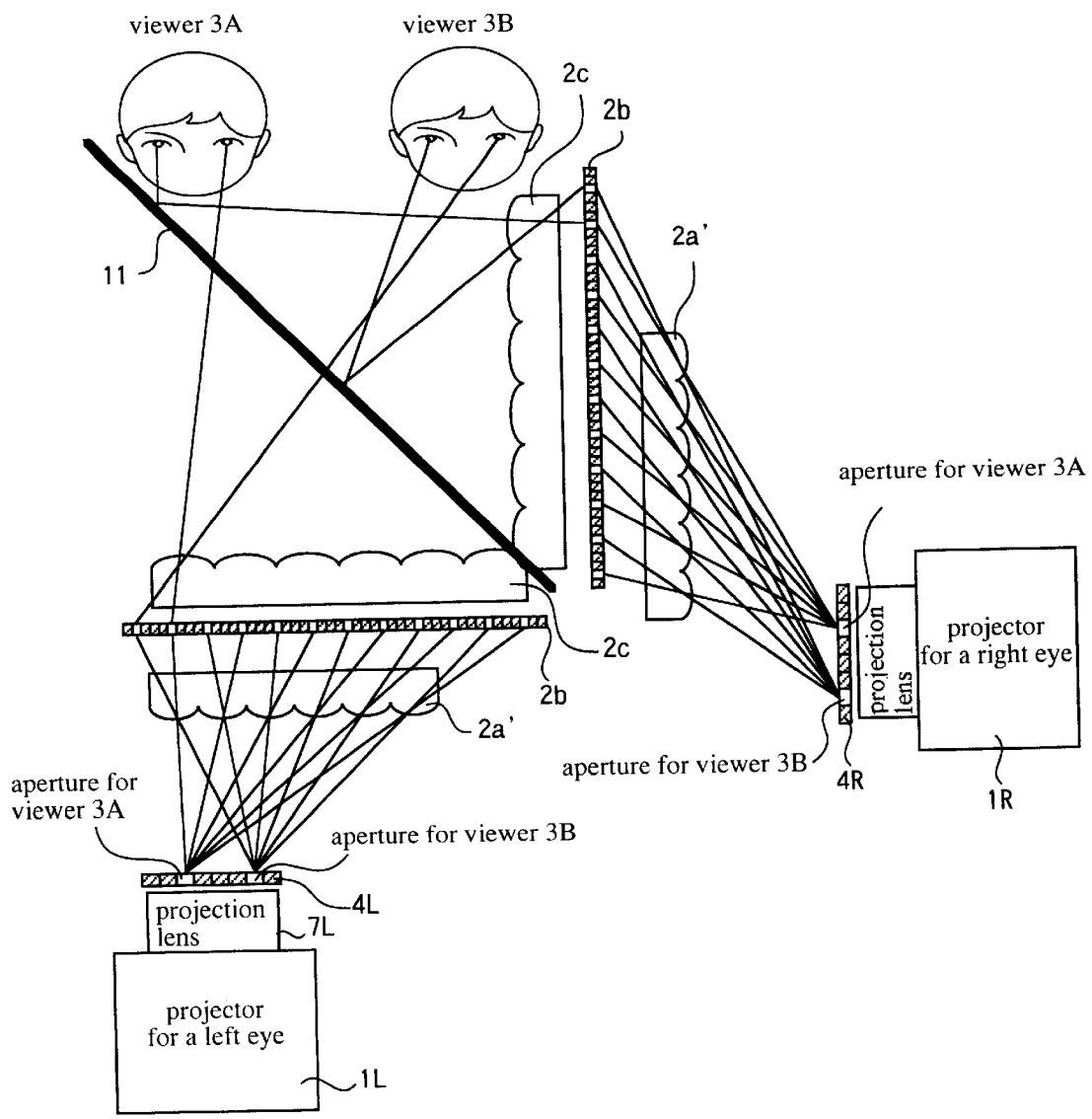
FIG. 6 is an explanatory view showing a stereoscopic display without using eye-glasses according to a second embodiment of the present invention.

FIG. 6 is an explanatory view showing a construction in a simplified manner of a stereoscopic display without using eye-glasses that is composed by two one-eye systems in this embodiment. A right-eye system comprises a projector for a right eye 1R, a shutter means 4R, lenticular lens on a light incident side 2a' which is equivalent to the lenticular lens on a light incident side 2a, a diffusing plate 2b, and lenticular lens on a light emitting side 2c shown in FIG. 1. A left-eye system comprises a projector for a left eye 1L, a shutter means 4L, lenticular lens on a light incident side 2a' which is equivalent to the lenticular lens on a light incident side 2a, a diffusing plate 2b, and lenticular lens on a light emitting side 2c shown in FIG. 1. A sensor 10 detecting a head position of a viewer 3 and a shutter control means 5 are equipped (both are not shown in the figure).

Figure 7:
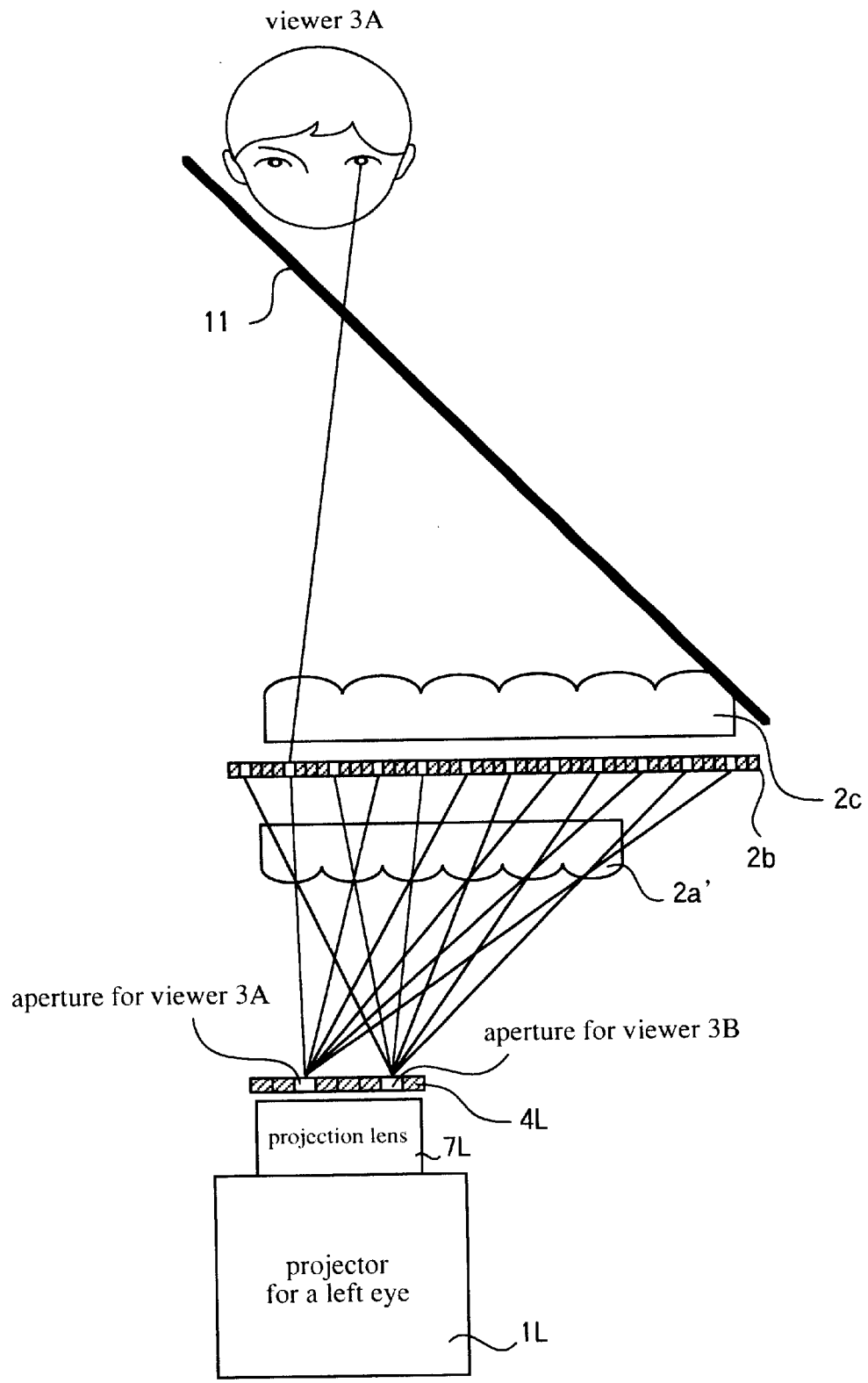
FIG. 7 is a magnified explanatory view showing the system for a left eye in FIG. 6.

FIG. 7 is an explanatory view of a left-eye system. Regarding to a right-eye system, since its construction and function are basically same as the left-eye system except for a displayed image, an explanatory view of a right-eye system is omitted. Explanation only on a left-eye system will be made. A lens pitch of lenticular lens on a light incident side 2a' is set so as to be approximately half of the lens pitch of the lenticular lens on a light incident side 2a of FIG. 1. Only an image for a left eye is formed on a diffusing plate 2b. The size of each image forming region for a left eye is same as that of in FIG. 1. Also, the size of a narrow-width image forming region (light emitting point) is same as that of in FIG. 1.

A half mirror 11 transmits an image for a left eye from the left-eye system and reflects an image for a right eye from the right-eye system, guiding each image light to the eyes of the viewers 3A and 3B.

Although the above embodiment describes the case where the shutter means 4L, 4R have eight shutter regions respectively, other constructions are also possible. The number of the shutter region can increase, for example, to sixteen in order to control the shutter regions of the shutter means 4L, 4R in response to the shifts of head positions of viewers when many viewers observe the image. In such a case, the number of images in the narrow-width image light reaching region of a narrow width which is formed in each image forming region on the diffusing plate 2b increases, where the stereoscopic image can be observed by much more viewers.

Figure 8:
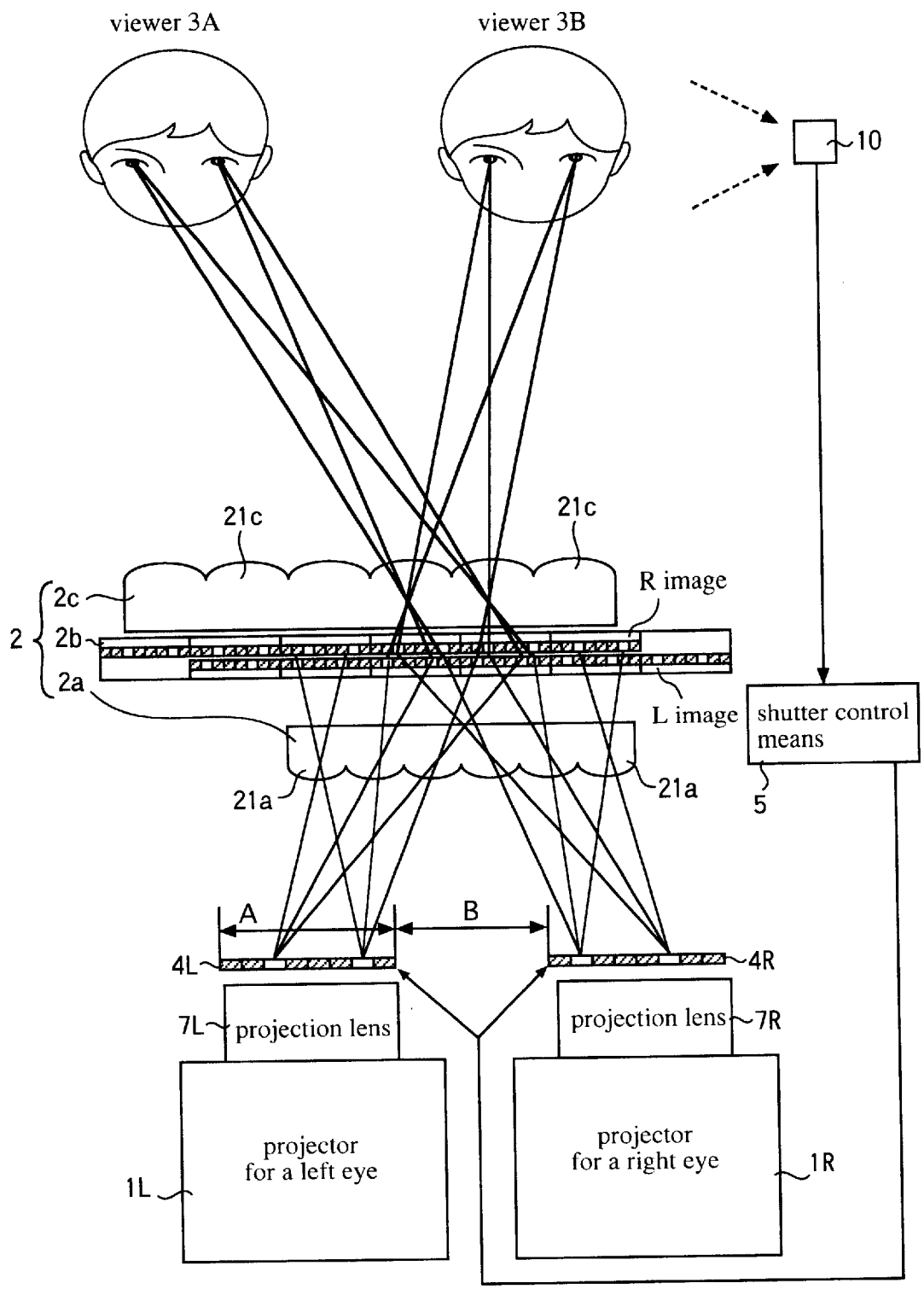
FIG. 8 is an explanatory view showing a stereoscopic display according to a third embodiment of the present invention.
Figure 9:
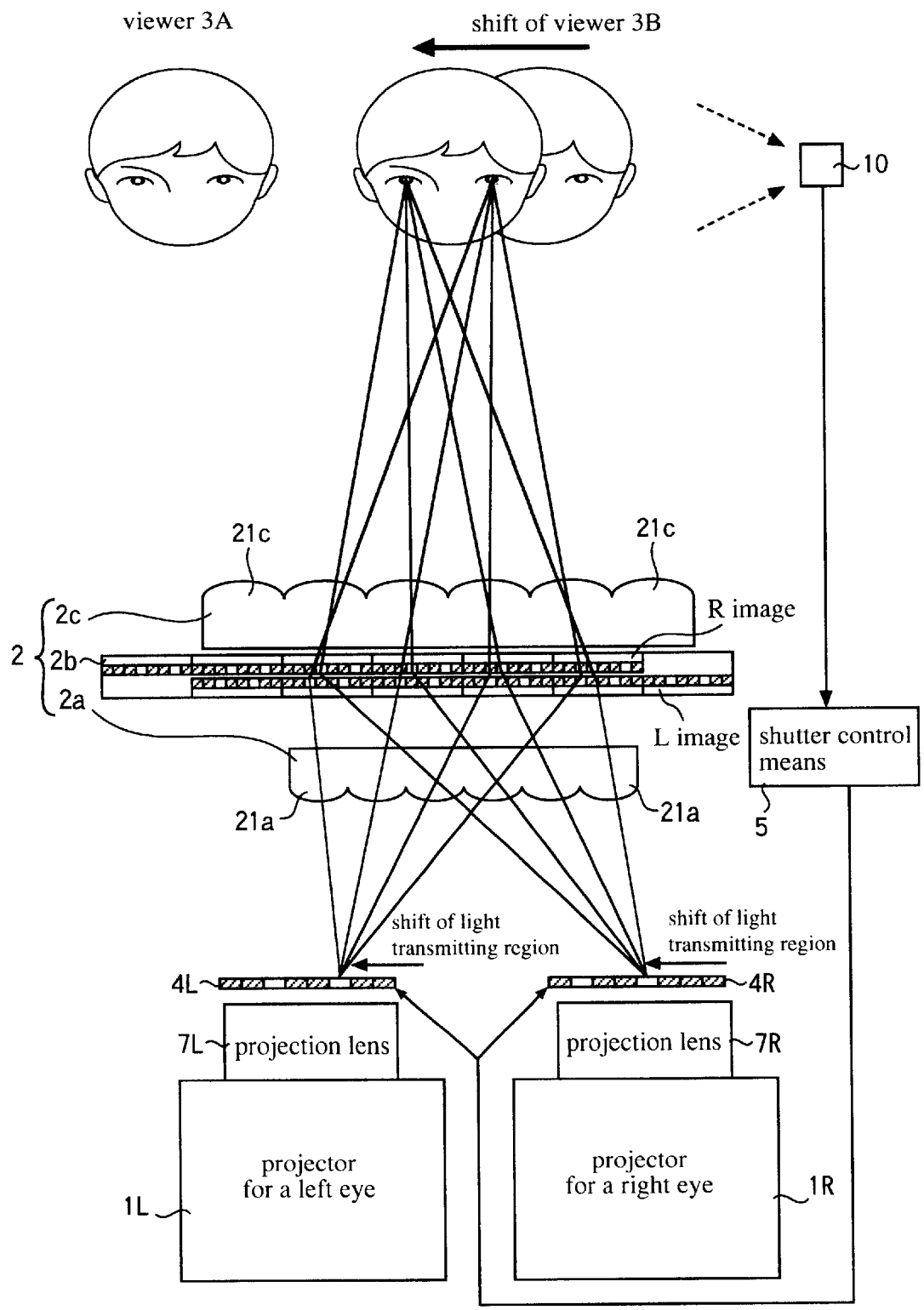
FIG. 9 is an explanatory view showing an appearance where a viewer moves from the position illustrated in FIG. 8 by the interval between the viewer's pupils.

FIG. 8 is an explanatory view showing a stereoscopic display without using eye-glasses in a third embodiment. FIG. 9 is an explanatory view showing an appearance where the head of the viewer 3B moves to left from the position in FIG. 8 by the interval between the viewer's pupils.

The stereoscopic display without using eye-glasses in this embodiment comprises a screen, a projector for a left eye 1L as a first projector, a projector for a right eye 1R as a second projector, shutter means 4L (a first shutter means), 4R (a second shutter means) which are arranged in front of projection lenses 7L, 7R of the projectors 1L, 1R respectively, a sensor 10 detecting head positions of the viewers 3 . . . , and a shutter control means 5 which controls the shutter means 4L in response to values detected by the sensor.

The projector for a left eye 1L projects an image for a left eye. The projector for a right eye 1R projects an image for a right eye. For example, a liquid crystal projector is employed as the projectors 1L, 1R.

Each of the shutter means 4L, 4R has eight shutter regions disposed laterally which can switch light transmission and light shading and of which width is shorter than those of the projection lenses 7L, 7R. The length of the whole shutter regions (shown as "A" in the figure) are equal from one another, and the shutter regions are arranged to be spaced apart from one another by the same length (shown as "B" in the figure) as the whole shutter regions (B=A). The shutter means 4L, 4R include a TN liquid crystal layer, a pair of transparent glass plates which sandwich the TN liquid crystal layer, ITO strip-pattern electrode of one glass plate, ITO electrode of another glass plate, and a light polarizing plate on a light emitting side or light polarizing plates on a light emitting side and on a light incident side. The ITO stripe-pattern electrode includes ITO layer of eight vertical stripe-shape which correspond with the number of the shutter regions. Although the shutter means in this embodiment is composed by a TN liquid crystal panel, liquid crystal panels of other types, such as polymer dispersed liquid crystal panel, can also be used.

The shutter control means 5 controls light transmission and light shading of the shutter regions on the basis of the output from the sensor 10 in response to positions of the viewers 3. In FIG. 8 where two persons (3A and 3B) observe an image, the shutter means 4L chooses the third and seventh shutter regions from the left side of the figure as the apertures, and the shutter means 4R chooses the second and sixth shutter regions from the left side of the figure as the apertures. In FIG. 9 where the head of the viewer 3B illustrated in FIG. 8 shifts to the left by the interval between the viewer's pupils, the shutter means 4L chooses the third and sixth shutter regions from the left side of the figure as the apertures, and the shutter means 4R chooses the second and fifth shutter regions from the left side of the figure as the apertures.

The screen 2 comprises by a diffusing plate 2b as an image forming surface, lenticular lens on a light incident side 2a as an image forming means arranged on a light incident side of the diffusing plate 2b, and lenticular lens on a light emitting side 2c as a light guide means arranged on a light emitting side of the diffusing plate 2b. The lenticular lens on a light incident side 2a includes lens portions 21a. The lenticular lens 2a on the light incident side includes lens portions 21a . . . and forms images for left and right eyes projected from the projectors 1L and 1R, in vertical stripe-shape onto the diffusing plate 2b and displays image forming regions for a left eye and for a right eye by overlapping each other. By passing through the shutter means 4L, 4R and the lenticular lens on the light incident side 2a, narrow-width images for a left eye of which number corresponds with that of the shutter regions chosen as apertures are formed in an image forming region for a left eye (L image region) of an image forming region (each image forming region) corresponding with each pixel on the diffusing plate 2b, narrow-width images for a right eye of which number corresponds with that of the shutter regions chosen as apertures are formed in an image forming region for a right eye (R image region) of an image forming region (each image forming region) corresponding with each pixel on the diffusing plate 2b. The lenticular lens on the light emitting side 2c includes lens portions 21c . . . which are placed by a pitch corresponding with a pitch of each image forming region of the diffusing plate 2b (a pixel pitch). The lens portions 21c . . . have almost the same pitch as the lens portion of a lenticular lens on a light emitting side in FIG. 15. A narrow-width image for a left eye which is formed in an image forming region for a left eye on the diffusing plate 2b in response to each shutter region of light transmitting state is guided to the left eyes of the viewer 3A and 3B. A narrow-width image for a right eye which is formed in an image forming region for a right eye on the diffusing plate 2b in response to each shutter region of light transmitting state is guided into the right eyes of the viewers 3A and 3B.

When all the shutter regions of the shutter means 4L and 4R are chosen as apertures (the whole area becomes transparent), the whole area of each pixel image forming region on the diffusing plate 2b serves as a light emitting point. Consequently, an image, which passes through each lens portion 21c in each image forming region and is observed at a viewing position, becomes much larger than the interval between the viewer's pupils, resulting in that the viewer can not recognize a stereoscopic image and that the images for a left eye and for a right eye overlap when they are formed on the diffusing plate 2b. When an image light passes by a width corresponding with one shutter region of the shutter means 4L and 4R, that single region of each pixel image forming region (a narrow-width image forming region) on the diffusing plate 2b serves as a light emitting point. Consequently, an image, which passes through each lens portion 21c and is observed at a viewing position, is equal to the interval between the viewer's pupils. When the single region of the narrow-width image forming region shifts by one, an image, which passes through each lens portion 21c in this area and is observed at a viewing position, shifts by a length equal to the interval between the viewer's pupils.

As shown in FIG. 9, only the viewer 3B shifts to the left from the position illustrated in FIG. 8 by the interval between the viewer's pupils. A sensor 10 detects the shift of the viewer 3B and gives that information to a shutter control means 5. The shutter control means 5 gives signals on shutter ON/OFF information to the shutter means 4L and 4R. The shutter ON/OFF signal in the case of FIG. 9 tells the shutter means 4L to close the seventh shutter region and open the sixth shutter region (to make light transmit) from the left side of the figure and tells the shutter means 4R to close the sixth shutter region and open the fifth shutter region (to make light transmit) from the left side of the figure.

When an open shutter region shifts, a single region of image forming regions for a left eye on the diffusing plate 2b (the narrow-width image forming region) shifts to the right by one and an image, which passes through each lens portion 21c and is observed at a viewing position, shifts to the left by a length equal to the interval between the viewer's pupils, resulting in that the viewer can observe a stereoscopic image even at a position after moving. The image forming regions for left and-right- eyes are formed and overlap each other onto the diffusing plate 2b. Each image forming region can be larger than that when the regions are formed alternately each other, resulting in that more narrow-width image light reaching regions can be formed in each image forming region.

The above explanation is made on the basis that the shutter means 4L, 4R are arranged to be spaced apart from each other laterally by a length of the whole shutter region (B=A). It is, however, not limited to that example. For example, they can be arranged to be spaced apart from each other by a length integer(N) times as long as the length of the whole shutter region. In such a construction, a single image forming regions of image forming regions for a left eye and for a right eye are formed on the diffusing plate 2b and are formed on the same area. Consequently each image shifts by a length of N pixels. Therefore, a desired stereoscopic image can be observed when either of the image for a left eye or the image for a right eye, which are formed on the same single image forming region on the diffusing plate 2b shifts to the opposite direction by a length of N pixels.

Figure 10:
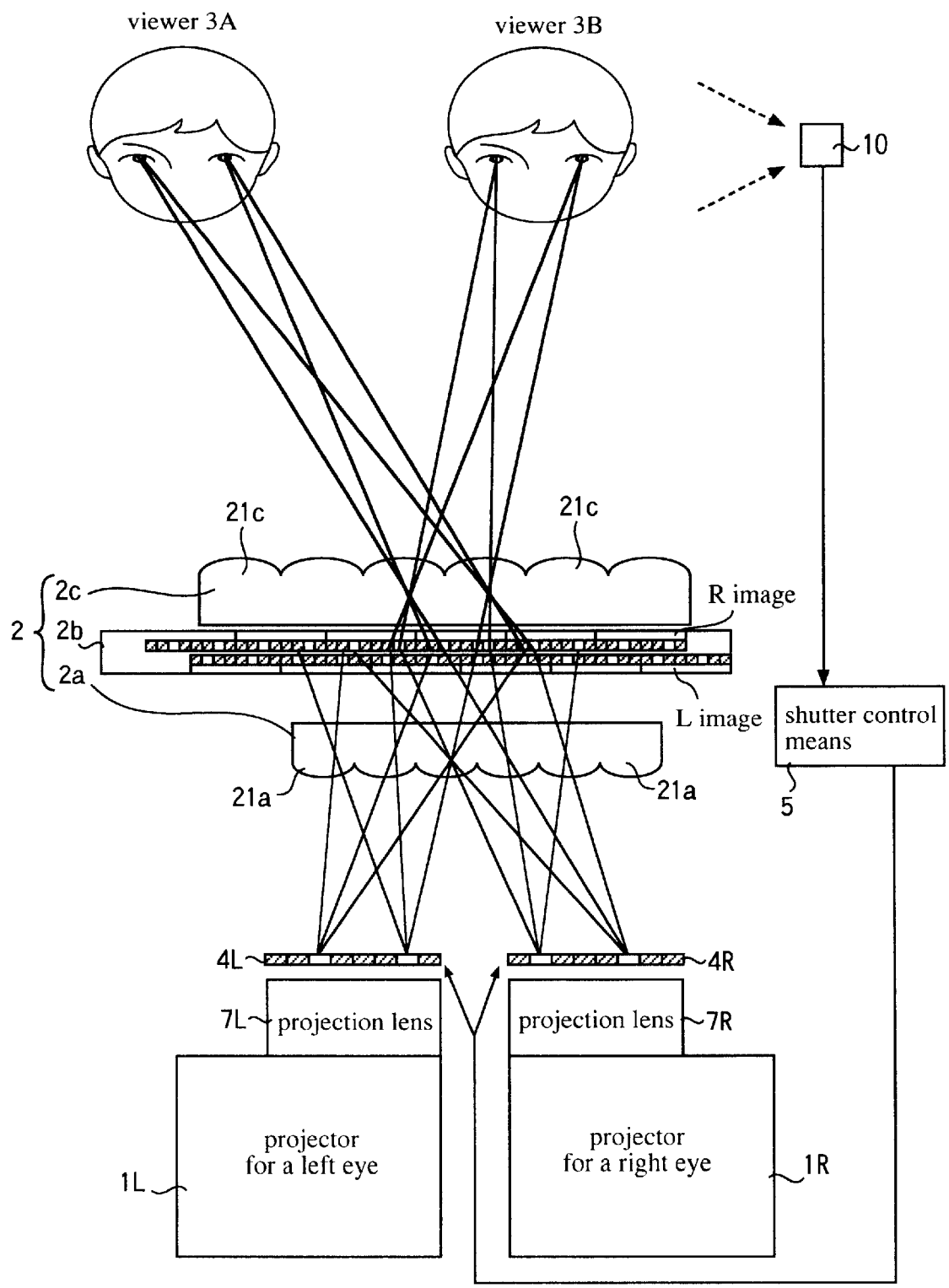
FIG. 10 is an explanatory view showing another arrangement of the projectors in FIG. 8.

As shown in FIG. 10, the shutter means 4L, 4R can be arranged to be spaced apart from each other laterally by a half length of the whole shutter region, not by a length N times as long as the length of the whole shutter region. In this case, image forming regions for a right eye formed on the diffusing plate 2b shifts by half width of an image forming region against image forming regions for a left eye. Consequently, a narrow-width image light reaching region that is formed on the diffusing plate 2b in case of that the first shutter region of the shutter means 4L from the left side of the picture opens, and a narrow-width image light reaching region that is formed on the diffusing plate 2b in case of that the fifth shutter region of the shutter means 4R from the left side of the picture opens share the same region. Each of the shutter regions of the shutter means 4L corresponds with each of the shutter regions of the shutter means 4R which shifts by width of four regions from the left to the right of the figure. A desired stereoscopic image can be observed when an image for a left or right eye, which is formed on the same image forming region on the diffusing plate 2b, is formed by shifting by half length of a pixel.

Figure 11:
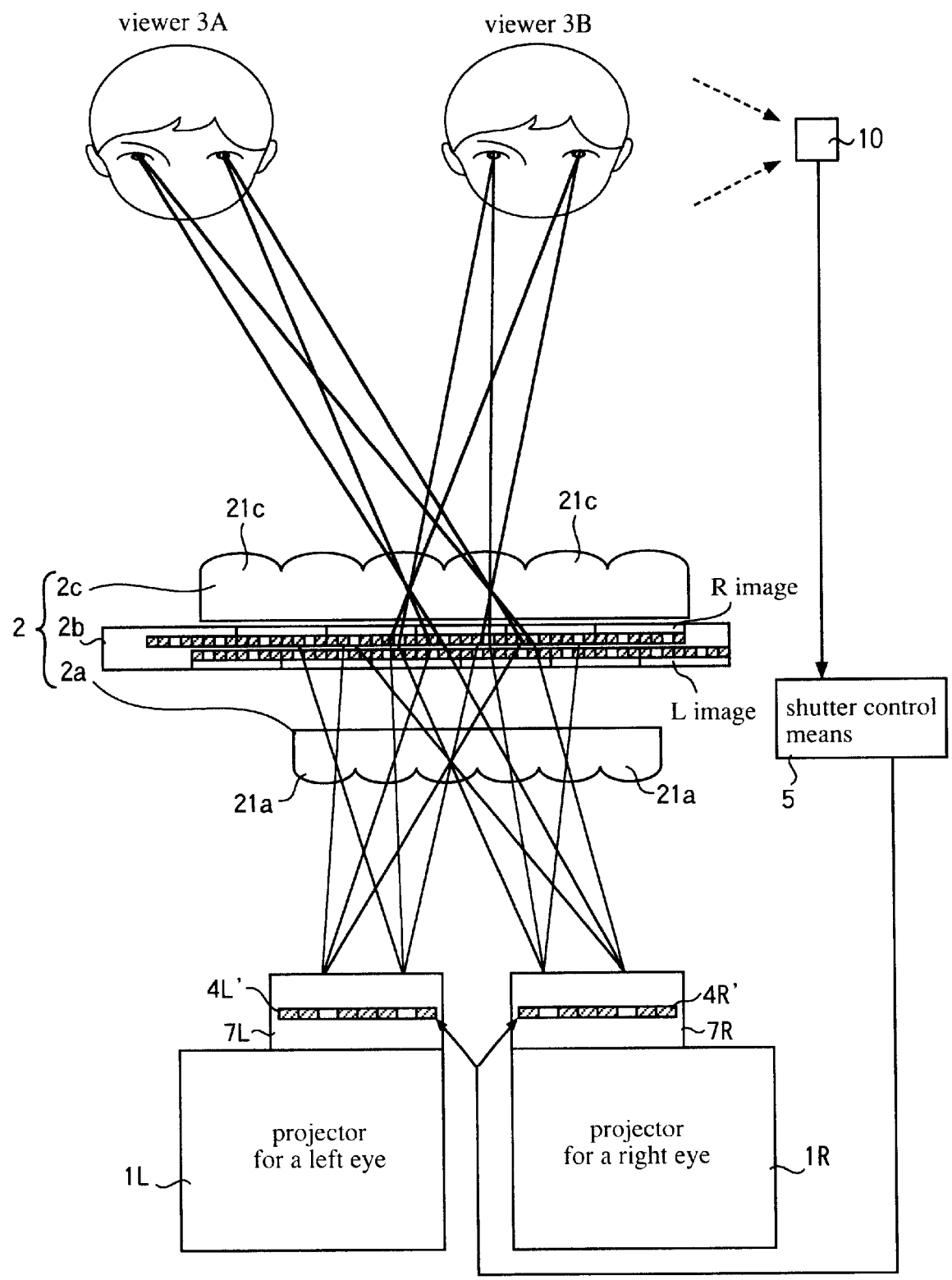
FIG. 11 is an explanatory view showing another example of a stereoscopic display without using eye-glasses according to the third embodiment, where a shutter is arranged at a stop of a projection lens.

As shown in FIG. 11, the shutter means 4L', 4R' can be arranged at a stop of the projector lenses 7L, 7R, although they are arranged in front of the projector lenses 7L, 7R of the projectors 1L, 1R in this embodiment. This arrangement is effective in the following case as described in the above embodiment; the shutter means 4L, 4R are arranged in front of the projection lenses 7L, 7R of the projectors 1L, 1R, the image light may not reach the narrow-width image light reaching region in each image forming region, and fail to form an image due to the arrangement of compositions such as the projectors 1L, 1R, the diffusing, plate 2b etc. The image should have been formed at both ends of the diffusing plate 2b in response to the transmitting regions of the shutter means 4L, 4R. When the shutter means 4L', 4R' are arranged at the stop of the projection lenses 7L, 7R, even image light from the projectors 1L, 1R are projected from the projection lenses 7L, 7R regardless of the shutter regions of the shutter means 4L', 4R'. As a result, the image is formed in one of the narrow-width image light reaching regions in the image forming region on the diffusing plate 2b in response to the light transmitting region of the shutter means without failure.

Although the above embodiment describes the case where the shutter means 4L, 4R have eight shutter regions respectively, other constructions are also possible. The number of the shutter region can increase, for example, to sixteen in order to control the shutter regions of the shutter means 4L, 4R in response to the shifts of head positions of viewers when many viewers observe the image. In such a case, the number of images in the narrow-width image light reaching region of a narrow width which is formed in each image forming region on the diffusing plate 2b increases, where the stereoscopic image can be observed by much more viewers.

Figure 12:
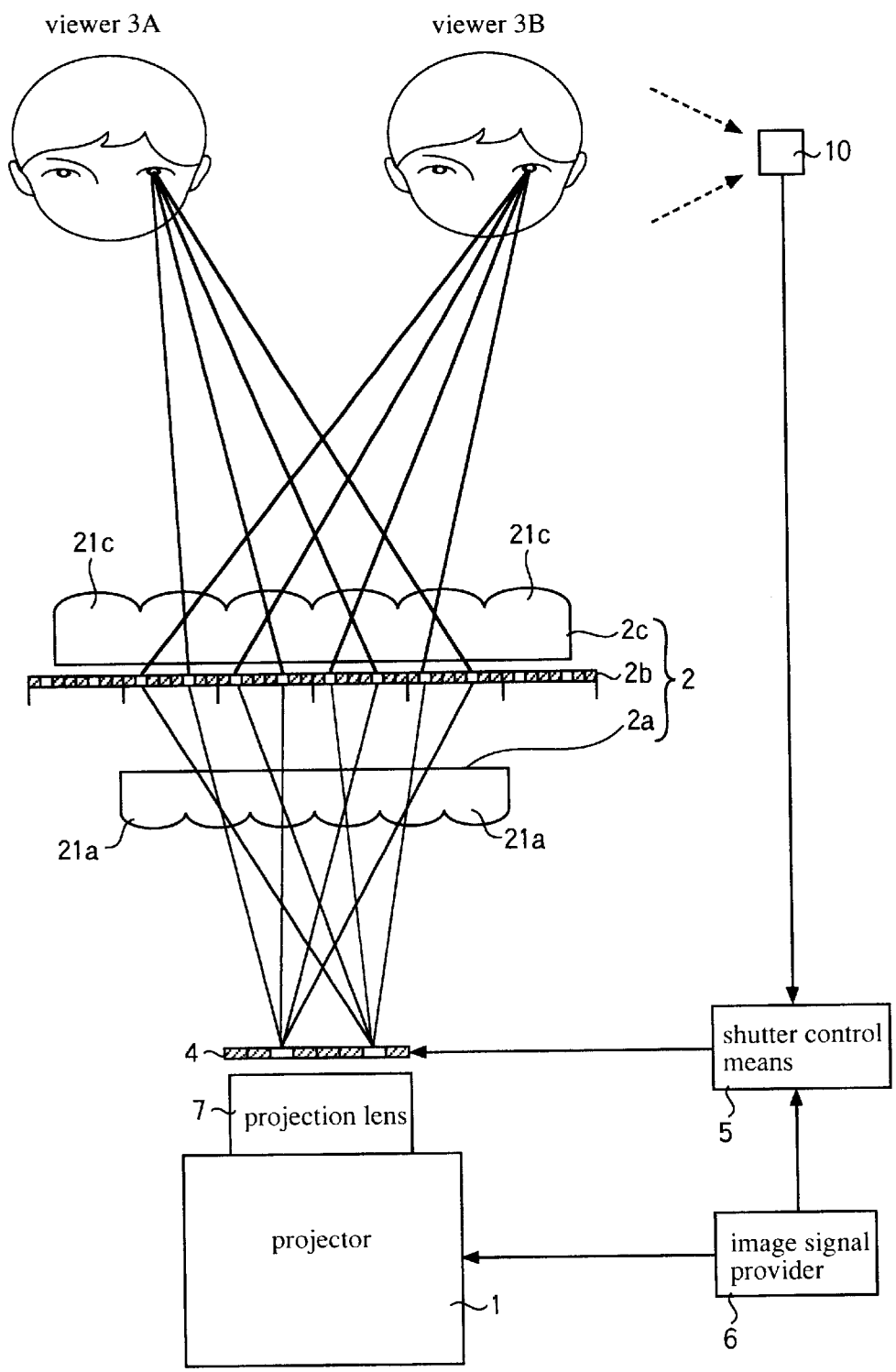
FIG. 12 is an explanatory view showing a stereoscopic display according to a fourth embodiment.
Figure 13:
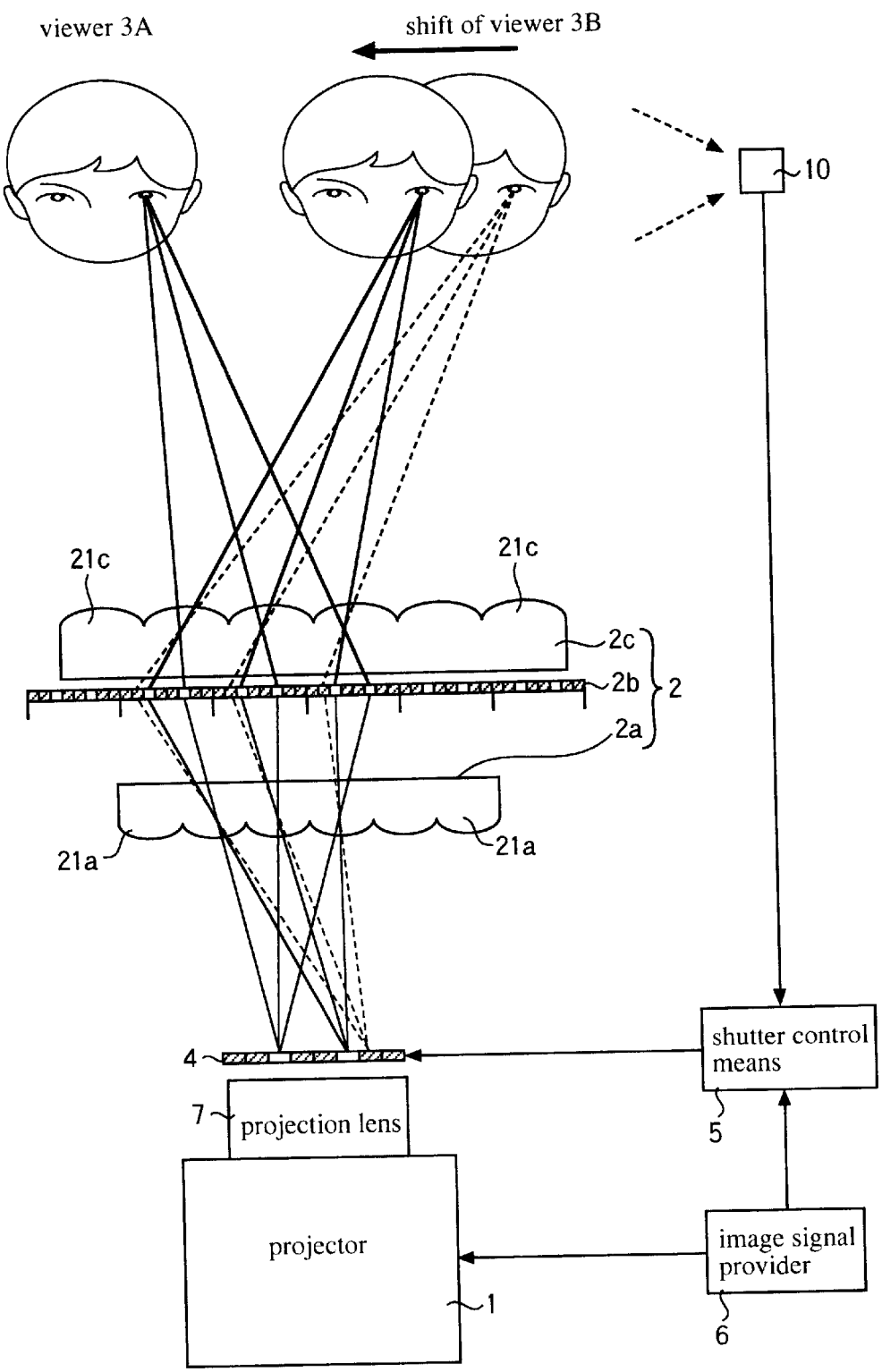
FIG. 13 is an explanatory view showing an appearance where a viewer moves from the position illustrated in FIG. 12 by the interval between the viewer's pupils.

FIG. 12 is an explanatory view showing a stereoscopic display without using eye-glasses according to a forth embodiment. FIG. 13 is an explanatory view showing an appearance where the head of the viewer 3B moves to the left by the interval between the viewer's pupils from the position illustrated in FIG. 12.

The stereoscopic display in this embodiment comprises a screen 2, a projector 1, a shutter means 4 which is arranged in front of projection lens of the projector 1, a sensor 10 detecting a head position of the viewers 3 . . . , a shutter control means 5 which controls the shutter means 4 in accordance with values detected by the sensor 10, and an image signal provider 6.

The projector 1 projects images for a left eye and for a right eye on the basis of image signals from the image signal provider 6. For example, a liquid crystal projector is used as the projector 1. The image signal provider 6 processes image signals and provides them to the projector 1. Then, the projector 1 projects an image for a left eye and an image for a right eye in sequence.

The shutter means 4 has eight shutter regions disposed laterally which can switch light transmission and light shading and of which width is shorter than that of the projection lens 7. The shutter means 4 includes a TN liquid crystal layer, a pair of transparent glass plates which sandwich the TN liquid crystal layer, ITO strip-pattern electrode of one glass plate, ITO electrode of another glass plate, and a light polarizing plate on a light emitting side or light polarizing plates on a light emitting side and on a light incident side. The ITO stripe-pattern electrode includes ITO layer in eight vertical stripe-shape corresponding with the number of the shutter regions. Although the shutter means in this embodiment is composed by a TN liquid crystal panel, liquid crystal panels of other types, such as polymer dispersed liquid crystal panel can also be used.

The shutter control means 5 controls light transmission and light shading of the shutter regions in response to positions of the viewers 3 . . . on the basis of output results from the sensor 10. In FIG. 12 where two persons (3A and 3B) observe an image, the shutter means 4 chooses the third and seventh shutter regions from the left side of the figure as the apertures to make light transmit in simultaneous with projection timing of an image for a left eye to be projected from the projector 1, and the shutter means 4 chooses the second and sixth shutter regions from the left side of the figure as the apertures in simultaneous with projection timing of an image for a right eye to be projected from the projector 1 in order to divide projecting time. In FIG. 13 where the head of the viewer 3B illustrated in FIG. 12 shifts to the left by the interval between the viewer's pupils, the shutter means 4 chooses the third and sixth shutter regions from the left side of the figure as the apertures in simultaneously with projection timing of an image for a left eye to be projected from the projector 1, and the shutter means 4 chooses the second and fifth shutter regions from the left side of the figure as the apertures in simultaneous with projection timing of an image for a right eye to be projected from the projector 1 in order to divide projecting time.

The screen 2 comprises a diffusing plate 2b as an image forming surface, lenticular lens on a light incident side 2a as an image forming means arranged on a light incident side of the diffusing plate 2b, and lenticular lens on a light emitting side 2c as a light guide means arranged on a light emitting side of the diffusing plate 2b. The lenticular lens on a light incident side 2a includes lens portions 21a . . . and forms images for left and right eyes projected from the projectors 1L and 1R, in vertical stripe-shape onto the diffusing plate 2b. By passing through the shutter means 4 and the lenticular lens on the light incident side 2a, narrow-width images for a left eye of which number corresponds with that of the shutter regions chosen as apertures are formed in an image forming region corresponding with each pixel (each pixel region) on the diffusing plate 2b, narrow-width images for a right eye of which number corresponds with that of the shutter regions chosen as apertures are formed in an image forming region corresponding with each pixel (each pixel region) on the diffusing plate 2b. The lenticular lens on the light emitting side 2c includes lens portions 21c which are laid out by a pitch corresponding to a pitch of each image forming region of the diffusing plate 2b. The lens portion 21c has the same pitch as the lens portion of a lenticular lens on a light emitting side in FIG. 8. A narrow-width image for a left eye which is formed in an image forming region on the diffusing plate 2b in corresponding to each shutter region of light transmitting state is guided into the left eyes of the viewer 3A and 3B. A narrow-width image for a right eye which is formed in an image forming region on the diffusing plate 2b in corresponding to each shutter region of light transmitting state is guided into the right eyes of the viewer 3A and 3B.

When all the shutter regions of the shutter means 4 are chosen as apertures (the whole area becomes transparent), the whole area of each image forming region on the diffusing plate 2b serves as a light emitting point. Consequently, an image, which passes through each lens portion 21c from each image forming region and is observed at a viewing position, becomes much larger than the interval between the viewer's pupils, resulting in that the viewer can not recognize a stereoscopic image. When an image light passes by a width corresponding with one shutter region of the shutter means 4, that single region of each image forming region (a narrow-width image forming region) on the diffusing plate 2b serves as a light emitting point. Consequently, an image corresponding to the single region, which passes through each lens portion 21c and is observed at a viewing position, is equal in size to the interval between the viewer's pupils. When the single region of the narrow-width image forming region shifts by one, an image, which passes through each lens portion 21c in this area and is observed at a viewing position, shifts by a length equal to the interval between the viewer's pupils.

As shown in FIG. 13, only the viewer 3B shifts to the left from the position illustrated in FIG. 12 by the interval between the viewer's pupils. A sensor 10 detects the shift of the viewer 3B and gives that information to a shutter control means 5. The shutter control means 5 gives signals on shutter ON/OFF information to the shutter means 4. The shutter ON/OFF signal in the case of FIG. 13 tells the shutter means 4 to close the seventh shutter region and open the sixth shutter region (to make light transmit) from the left side of the figure in order to project an image for a left eye from the projector 1 and tells the shutter means 4 to close the sixth shutter region and open the fifth shutter region (to make light transmit) from the left side of the figure in order to project an image for a right eye from the projector 1. When an open shutter region shifts, a single region of image forming regions (the narrow-width image forming region) on the diffusing plate 2b shifts to the right by one and an image corresponding to the single region, which passes through each lens portion 21c and is observed at a viewing position, shifts to the left by a length equal to the interval between the viewer's pupils, resulting in that the viewer can observe a stereoscopic image even at a position after moving.

Another example for the forth embodiment of this invention will be described in detail hereinbelow with reference to the drawings.

Figure 14:
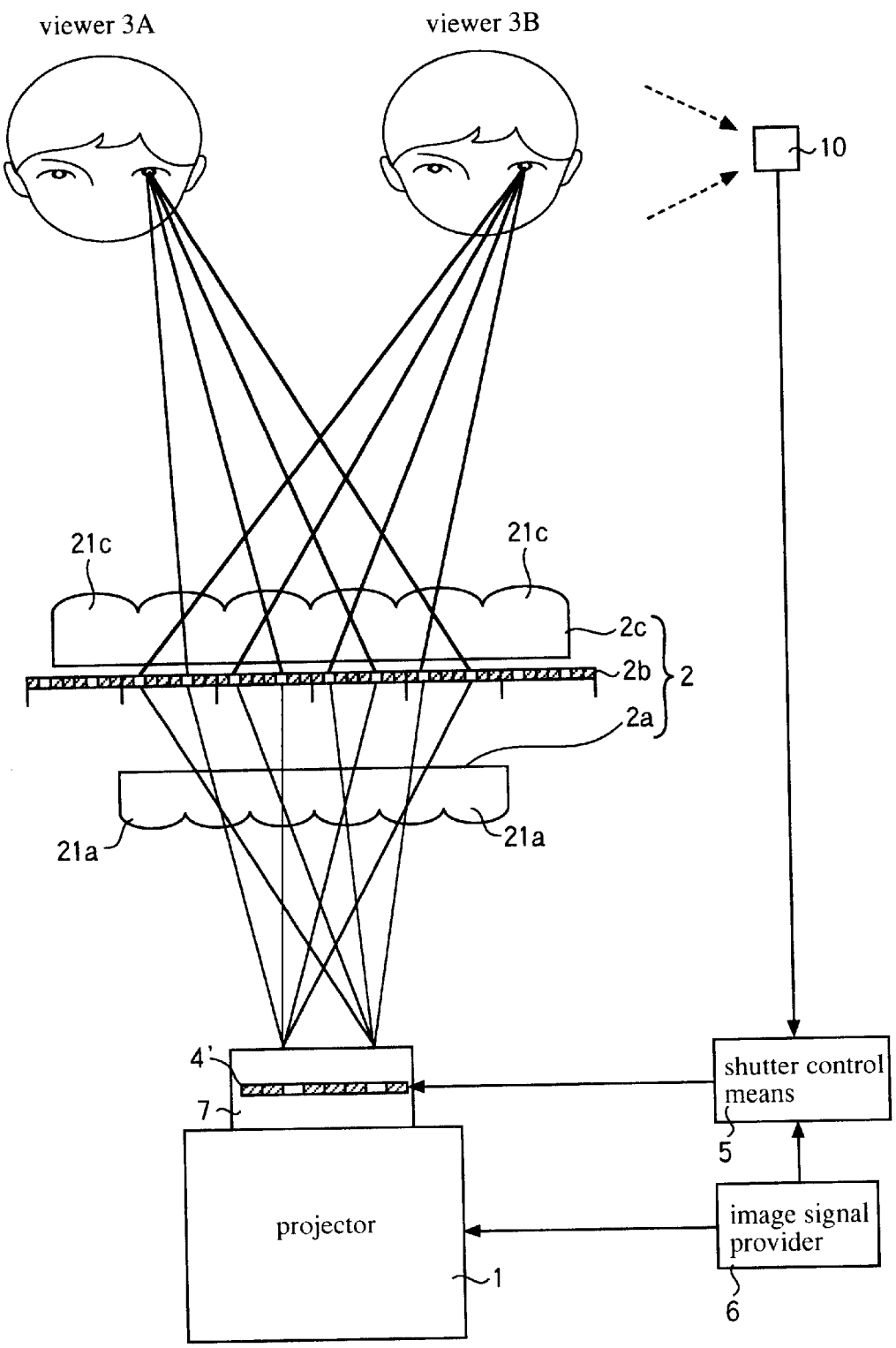
FIG. 14 is an explanatory view showing another example of a stereoscopic display without using eye-glasses according to the forth embodiment, where a shutter is arranged at a stop of a projection lens.

FIG. 14 is an explanatory view showing another example of a stereoscopic display without using eye-glasses according to the forth embodiment. FIG. 14 illustrates that the shutter means 4 which is arranged in front of the projection lens 7 of the projector 1 is arranged at the stop of the projection lens 7.

As described in the forth embodiment, when the shutter means 4 is arranged in front of the projection lens 7 of the projector 1, the following problem may occur. Image light may not reach a narrow-width image light reaching region in each image forming region and fail to form an image due to an arrangement of compositions such as a projector 1, a diffusing plate 2b etc., at the both ends of the diffusing plate 2b which should be formed in response to the transmitting region of the shutter means 4. To overcome this problem, the shutter means 4' should be arranged at a stop of the projection lens 7. Therefore, image light from the projector 1 is projected evenly from the projection lens 7 regardless of the shutter region of the shutter means 4', and an image is formed in one of the narrow-width image light reaching regions in each image forming region on the diffusing plate 2b in response to the light transmitting region of the shutter means 4' without failure.

It is to be understood that the invention is not limited in is application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The above embodiments employ lenticular lens as an image forming means and a light guide means, for example. Instead, parallax barriers can be used although it results in the loss of brightness. Furthermore, auto-stereoscopic display without using eye-glasses can be constructed by differentiating the displayed images in response to positions of viewers (switching and displaying pertinent images which were shoot from various directions).

What is claimed:

1. A stereoscopic display without using eye-glasses comprising,
    a first projector, which projects an image for a left eye,
    a second projector, which projects an image for a right eye,
    a first lenticular lens forms images for left and right eyes on a diffusing plate by overlapping an image forming region for the left eye projected by said first projector and an image forming region for the right eye projected by said second projector,
    a first shutter means which includes a plurality of shutter regions disposed laterally which switch between light transmission and light shading, and forms a narrow-width image light reaching region, of which width is less than that of the image forming region, in each image forming region for the left eye on said diffusing plate,
    a second shutter means which includes a plurality of shutter regions disposed laterally which switch between light transmissions and light shading, and forms a narrow-width image light reaching region, of which width is less than that of the image forming region, in each image forming region for the right eye on said diffusing plate,
    a second lenticular lens collects images from narrow-width image light reaching regions in the image forming regions for left and right eyes to a position spaced apart by a predetermined distance from said diffusing plate, and a width between the images is equal to or shorter than the distance between a pupil of the right eye and a pupil of the left eye of a viewer, and
    a shutter control means which controls light transmission and light shading of said shutter regions of said first and second shutter means on the basis of output results from a sensor which detects the viewer's position, wherein
        said shutter control means controls said first and second shutter means so as that the narrow-width image light reaching region in the image forming region for the left eye and the narrow-width image light reaching region in the image forming region for the right eye do not share a same region on the diffusing plate.

2. The stereoscopic display without using eye-glasses according to claim 1, wherein
    said first and second shutter means are arranged in front of projection lenses of said projectors and includes two or more than two shutter regions, which can switch between light transmission and light shading and are placed laterally in width less than that of said projection lens.

3. The stereoscopic display without using eye-glasses according to claim 1, wherein
    each shutter region of each shutter means has the same size, and the shutter means are laterally spaced apart from each other by a distance equal to a length integer multiplied by a length of the shutter region.

4. The stereoscopic display without using eye-glasses according to claim 1, wherein
    said first and second shutter means are arranged at a stop of projection lenses of said projectors and includes two or more than two shutter regions, which switch light transmission and light shading and are placed laterally in width less than the diameter of the stop.

* * * * *